(12) United States Patent
Oliner

(10) Patent No.: US 11,789,993 B2
(45) Date of Patent: *Oct. 17, 2023

(54) CORRELATING NON-TEXT MACHINE DATA USING EVENT FIELDS

(71) Applicant: SPLUNK Inc., San Francisco, CA (US)

(72) Inventor: Adam Oliner, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/163,883

(22) Filed: Feb. 1, 2021

(65) Prior Publication Data

US 2021/0209145 A1 Jul. 8, 2021

Related U.S. Application Data

(63) Continuation of application No. 15/582,473, filed on Apr. 28, 2017, now Pat. No. 10,956,481, which is a continuation-in-part of application No. 15/224,491, filed on Jul. 29, 2016, now Pat. No. 11,314,799.

(51) Int. Cl.
*G06F 16/00* (2019.01)
*G06F 16/43* (2019.01)
*G06F 16/438* (2019.01)

(52) U.S. Cl.
CPC ............ *G06F 16/43* (2019.01); *G06F 16/438* (2019.01)

(58) Field of Classification Search
None
See application file for complete search history.

(56) References Cited

U.S. PATENT DOCUMENTS

| | | |
|---|---|---|
| 5,969,755 A | 10/1999 | Courtney |
| 6,424,370 B1 | 7/2002 | Courtney |
| 7,162,473 B2 | 1/2007 | Dumais et al. |
| 7,363,282 B2 | 4/2008 | Karnawat et al. |
| 7,937,344 B2 | 5/2011 | Baum et al. |
| 8,112,425 B2 | 2/2012 | Baum et al. |
| 8,412,696 B2 | 4/2013 | Zhang et al. |
| 8,751,529 B2 | 6/2014 | Zhang et al. |
| 8,788,525 B2 | 7/2014 | Neels et al. |
| 9,215,240 B2 | 12/2015 | Merza et al. |
| 9,286,413 B1 | 3/2016 | Coates et al. |
| 9,521,047 B2 | 12/2016 | Alekseyev et al. |
| 9,596,254 B1 | 3/2017 | Muddu et al. |
| 9,836,502 B2 | 12/2017 | Papale et al. |
| 9,922,066 B2 | 3/2018 | Swan et al. |
| 10,044,751 B2 | 8/2018 | Huston, III |
| 10,127,258 B2 | 11/2018 | Lamas et al. |
| 10,148,677 B2 | 12/2018 | Muddu et al. |

(Continued)

FOREIGN PATENT DOCUMENTS

WO 2017/006104 A1 1/2017

OTHER PUBLICATIONS

Syed et al., article entitled "The Future Revolution on Big Data" (Year: 2013).*

(Continued)

*Primary Examiner* — Jean M Corrielus
(74) *Attorney, Agent, or Firm* — Shook, Hardy & Bacon L.L.P.

(57) ABSTRACT

Described herein are technologies that facilitate effective use (e.g., indexing and searching) of non-text machine data (e.g., audio/visual data) in an event-based machine-data intake and query system.

17 Claims, 31 Drawing Sheets

(56) References Cited

U.S. PATENT DOCUMENTS

| | | | |
|---|---|---|---|
| 10,380,189 B2 | 8/2019 | Boe et al. | |
| 10,387,395 B2 | 8/2019 | Wu et al. | |
| 10,572,518 B2 | 2/2020 | Fletcher et al. | |
| 2002/0143531 A1 | 10/2002 | Kahn | |
| 2003/0053658 A1* | 3/2003 | Pavlidis | H04N 5/2624 348/E7.086 |
| 2003/0123703 A1* | 7/2003 | Pavlidis | G08B 13/19667 382/103 |
| 2004/0221311 A1 | 11/2004 | Dow et al. | |
| 2007/0016553 A1 | 1/2007 | Dumais et al. | |
| 2007/0154171 A1 | 7/2007 | Elcock et al. | |
| 2007/0282665 A1 | 12/2007 | Buehler et al. | |
| 2009/0070628 A1 | 3/2009 | Gupta et al. | |
| 2009/0276407 A1 | 11/2009 | Van Vleet et al. | |
| 2010/0070448 A1 | 3/2010 | Omoigui | |
| 2011/0208711 A1 | 8/2011 | Van Vleet et al. | |
| 2012/0191716 A1 | 7/2012 | Omoigui | |
| 2013/0013991 A1 | 1/2013 | Evans | |
| 2013/0262686 A1 | 10/2013 | Hill et al. | |
| 2014/0222826 A1 | 8/2014 | DaCosta et al. | |
| 2015/0039651 A1* | 2/2015 | Kinsely | G06F 16/254 707/779 |
| 2015/0296228 A1 | 10/2015 | Chen et al. | |
| 2015/0339324 A1 | 11/2015 | Westmoreland et al. | |
| 2016/0055225 A1 | 2/2016 | Xu et al. | |
| 2016/0103909 A1 | 4/2016 | Bhide et al. | |
| 2016/0103918 A1 | 4/2016 | Alekseyev et al. | |
| 2016/0105334 A1 | 4/2016 | Boe et al. | |
| 2016/0132575 A1 | 5/2016 | Fletcher et al. | |
| 2016/0253415 A1 | 9/2016 | Zhong et al. | |
| 2016/0350646 A1 | 12/2016 | Leeman-Munk et al. | |
| 2016/0351189 A1 | 12/2016 | Miller et al. | |
| 2017/0052680 A1 | 2/2017 | Chegini et al. | |
| 2018/0004785 A1 | 1/2018 | Marquardt et al. | |
| 2018/0032512 A1* | 2/2018 | Oliner | G06F 16/41 |
| 2018/0032557 A1* | 2/2018 | Oliner | G06F 16/438 |
| 2018/0032558 A1* | 2/2018 | Oliner | G06F 16/438 |
| 2018/0032861 A1* | 2/2018 | Oliner | G06Q 10/0637 |
| 2018/0032862 A1* | 2/2018 | Oliner | G06Q 10/0637 |
| 2018/0034879 A1 | 2/2018 | Chegini | |
| 2018/0089561 A1* | 3/2018 | Oliner | G06F 16/26 |
| 2018/0204120 A1 | 7/2018 | Rei et al. | |
| 2018/0307734 A1 | 10/2018 | Bingham et al. | |
| 2019/0098106 A1 | 3/2019 | Mungel et al. | |
| 2019/0258650 A1 | 8/2019 | Baum et al. | |

OTHER PUBLICATIONS

Lemoudden et al., article entitled "Managing cloud-generated logs using big data technologies" (Year: 2016).*
Adaptive background mixture models for real-time tracking, Stauffer et al., IEEE (Year: 1999).*
Event-based applications and enabling technologies, ACM, Hinze et al., (Year: 2009).*
Andrzejewski, David, et al., "Inferring compositional style in the neo-plastic paintings of Piet Mondrian by machine earning," Computer Vision and Image Analysis of Art, vol. 7531, International Society for Optics and Photonics, 2010, (Year: 2010), pp. 12.
Bitincka, Ledion, et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, pp. 9.
Carasso, David, "Exploring Splunk," published by CITO Research, New York, NY, Apr. 2012, pp. 156.
Splunk Cloud 8.0.2004 User Manual, available online, retrieved May 20, 2020 from docs.splunk.com, pp. 66.
Splunk Enterprise 8.0.0 Overview, available online, retrieved May 20, 2020 from docs.splunk.com, pp. 17.
Splunk Quick Reference Guide, updated 2019, available online at https://www.splunk.com/pdfs/solution-guides/splunk-quick-reference-guide.pdf, retrieved May 20, 2020, pp. 6.
Suh, Bongwon, et al., "Want to be retweeted? Large Scale Analytics on Factors Impacting Retweet in Twitter Network," IEEE Second International Conference on Social Computing, pp. 8 (2010).
U.S. Appl. No. 15/224,493, filed Jul. 29, 2016, Which is: Granted.
U.S. Appl. No. 16/692,144, filed: Nov. 22, 2019, Which is: Pending.
U.S. Appl. No. 15/224,489, filed Jul. 29, 2016, Which is: Pending.
U.S. Appl. No. 15/224,491, filed Jul. 29, 2016, Which is: Pending.
U.S. Appl. No. 15/582,473, filed Apr. 28, 2017, Which is: Granted.
U.S. Appl. No. 15/664,991, filed Jul. 31, 2017, Which is: Pending.
Ahmed, J. A., and Sarma, A. K., "Artificial neural network model for synthetic streamflow generation," Water resources management 2007, vol. 21, Issue 6, pp. 1015-1029 (2007).
Grimaila, M. R., et al., "Design and analysis of a dynamically configured log-based distributed security event detection methodology," The Journal of Defense Modeling and Simulation 2012, vol. 9, Issue 3, pp. 219-241 (2012).
Wen, T. H., et al. "Multi-domain neural network language generation for spoken dialogue systems," Computation and Language, arXiv:1603.01232, pp. 11 (Mar. 3, 2016).

* cited by examiner

FIG. 6A

Search Screen 600

Search | Pivot | Reports | Alerts | Dashboards  →  Search & Reporting

New Search  →  Save as menu  →  Save As ⌄  Close buttercupgames — Search Bar 602  —  Time Range Picker 612 — All time ⌄  🔍

✓ 36,819 events (before 4/30/14 2:19:02.000 PM)  Job ⌄  ■ ⏸ ↑ ⊕  ● Smart Mode ⌄

→ Search Results Tabs 604  → Search action buttons  → Search mode selector

Events (36,819) | Statistics | Visualization

Format Timeline ⌄  — Zoom Out  + Zoom to Selection  × Deselect  —  1 hour per column Timeline 605

‹ Prev  1  2  3  4  5  6  7  8  9  ...  Next ›

List ⌄  Format ⌄  20 Per Page ⌄

| i | Time | Event |
|---|------|-------|
| ‹ Hide Fields | ≡ All Fields | Events List 608 |
| > | 4/28/14<br>6:22:16.000 PM | 91.205.189.15 - - [28/Apr/2014:18:22:16] "GET /oldlink?itemId=EST-14&JSESSIONID=SD6SL7FF 7ADFF53113 HTTP 1.1" 200 1665 "http://www.[buttercupgames].com/oldlink?itemId=EST-14" "Moz illa/5.0 (Windwos NT 6.1; WOW 64) AppleWebKit/536.5 (KHTML, like Gecko) Chrome/19.0.1084. 46 Safari/536.5" 159<br>host = www2   source = tutorialdata.zip:./www/2/access.log   ; sourcetype = access_combined_wcookie |
| > | 4/28/14<br>6:20:56.000 PM | 182.236.164.11 - - [28/Apr/2014:18:20:56] "GET /cart.do?action=addtocart&itemId=EST-15&p [roductId]=85-AG-G09&JSESSIONID=SD6SL8FF10ADFF53101 HTTP 1.1" 200 2252 "http://www.[butterc upgames].com/oldlink?itemId=EST-15" "Mozilla/5.0 (Macintosh; Intel Mac OS X 10_7_4) Apple WebKit/536.5 (KHTML, like Gecko) Chrome/19.0.1084.46 Safari/536.5" 506<br>host = www1   source = tutorialdata.zip:./www/1/access.log   ; sourcetype = access_combined_wcookie |
| > | 4/28/14<br>6:20:55.000 PM | 182.236.164.11 - - [28/Apr/2014:18:20:56] "POST /oldlink?itemId=EST-18&JSESSIONID=SD6SL8 FF10ADFF53101 HTTP 1.1" 408 893 "http://www.[buttercupgames].com/product.screen?productId= SF-BVS-G01" "Mozilla/5.0 (Macintosh; Intel Mac OS X 10_7_4) AppleWebKit/536.5 (KHTML, li ke Gecko) Chrome/19.0.1084.46 Safari/536.5" 134<br>host = www1   source = tutorialdata.zip:./www/1/access.log   sourcetype = access_combined_wcookie |

Fields Sidebar 606

Selected Fields
- *a* host 3
- *a* source 3
- *a* sourcetype 1

Interesting Fields
- *a* action 5
- # bytes 100+
- *a* categoryId 8
- *a* clientip 100+
- # date_hour 24
- # date_mday 8
- # date_minute 60

| Data Summary | | |
|---|---|---|
| Hosts (5) / Sources (8) / Sourcetypes (3) | | × |
| filter | | |
| Host ⌄ | Count ⌄ | Last Update ⌄ |
| mailsv ⌄ | 9,829 | 4/29/14 1:32:47.000 PM |
| vendor_sales ⌄ | 30,244 | 4/29/14 1:32:46.000 PM |
| www1 ⌄ | 24,221 | 4/29/14 1:32:44.000 PM |
| www2 ⌄ | 22,595 | 4/29/14 1:32:47.000 PM |
| www3 ⌄ | 22,975 | 4/29/14 1:32:45.000 PM |

FIG. 6B

Original Search:
Search "error" | stats count BY host ← 802

Sent to peers:
Search "error" | prestats count BY host ← 804

Executed by search head:
Aggregate the prestats results received from peers ← 806

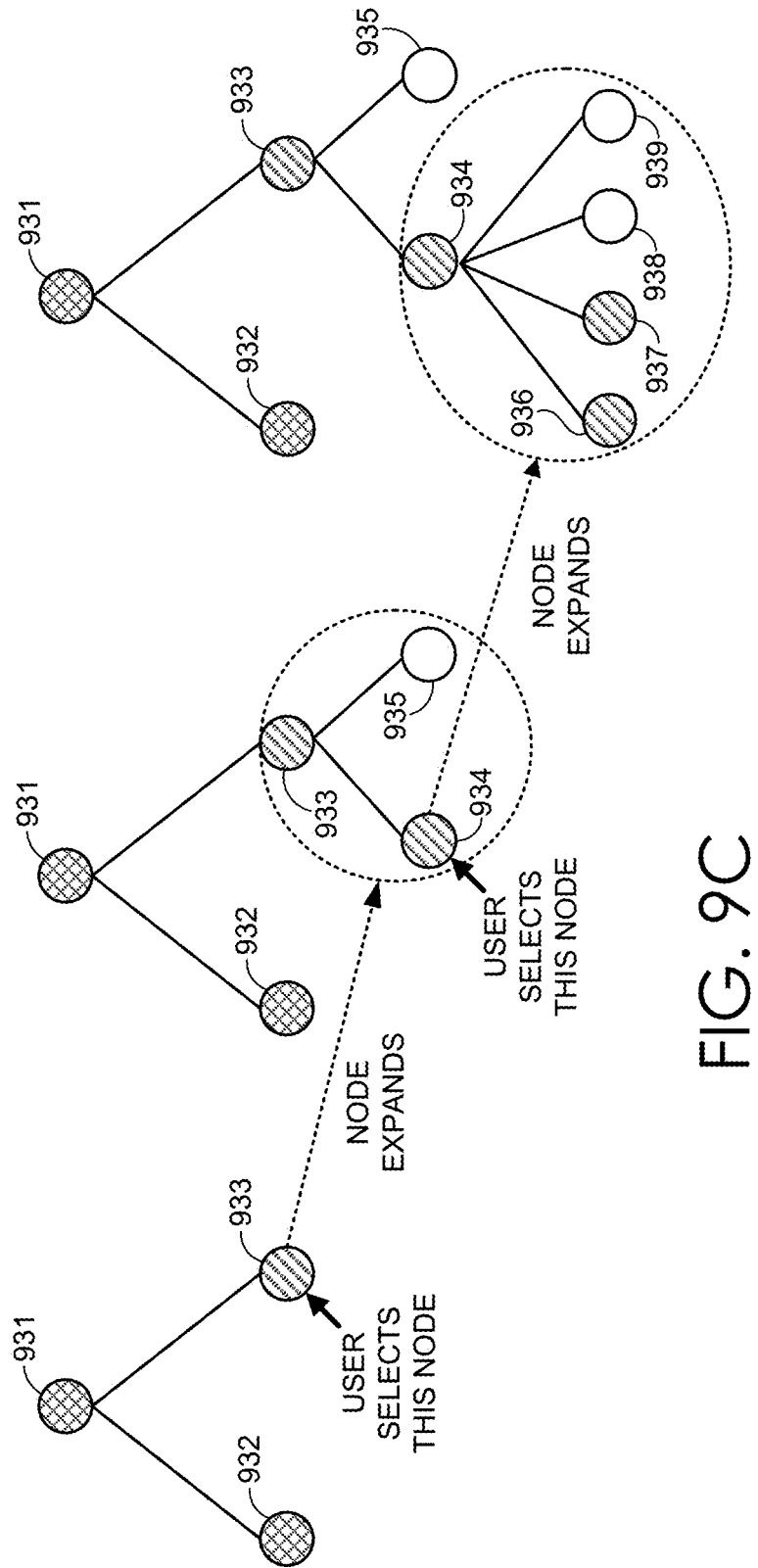

New Pivot 1,966 events (before 9/22/13 5:19:02.000 PM)

Filters: Highest 10 product name by price

All time — Highest 10 produ... — 1401

Split Rows product name — price — 1402

Save As... ▼ | Clear | Successful_purchases ▼

Split Columns

Complete

Column Values — 1403

Count of Success... | Sum of price

Documentation

| product name ⇅ | price ⇅ | Count of Successful purchases ⇅ | Sum of price ▼ |
|---|---|---|---|
| Dream Crusher | 39.99 | 227 | 9077.73 |
| Manganiello Bros. | 39.99 | 199 | 7958.01 |
| Orvil the Wolverine | 24.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

FIG. 14

New Pivot 1,776,004 of 1,776,004 events matched

Filters: All time

Split Rows: component

Split Columns: group

Column Values: Count of Event O...

| component | NULL | conf | deploy-connections | deploy-server | deploy-map | mpool | per_host_thruput | per_index_thruput | per_source_thruput | per_sourcetype_thruput | pipeline | queue | realtime_search_data |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenseUsage | 2872 | 0 | 0 | 0 | 0 | 0 | 0 | 0 | 0 | 0 | 0 | 0 | 0 |
| Metrics | 0 | 1 | 972 | 2916 | 972 | 972 | 4621 | 2843 | 9314 | 0 | 9306 | 18797 | 972 |
| OneShotWriter | 12226 | 0 | 0 | 0 | 0 | 0 | 0 | 0 | 0 | 0 | 0 | 12636 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

20 per page ∨   Format ∨

FIG. 15

| | | | |
|---|---|---|---|
| index=badgescans| | | Query Bar 2202 | All time ⌄ | 🔍 |
| ✓ 1,674 events (before 8/26/16 1:47:20.000) | | No Event Sampling ⌄ | Job ⌄ ❚❚ ■ ↗ 🖨 ⬇ | 📄 Verbose Mode ⌄ |

Events (1,674) | Patterns | Statistics | Visualization

Format Timeline ⌄ – Zoom Out + Zoom to Selection ✗ Deselect — 2204 — 1 day per column < Perv 1 2 3 4 5 6 7 8 9 … Next >

| < Hide Fields | ≣ All Fields | List ⌄ | ✎ Format ⌄ | 20 Per Page ⌄ | | |
|---|---|---|---|---|---|---|
| | | | i | Time | Event | Events List 2208 |
| Selected Fields | | | > | 8/8/16 11:27:56.000 AM | 1470680876, Entry, 4, Martha, Washington, Martha_Washington.jpg host= badgescan : source = badge_scans.csv : sourcetype = csv | |
| a host 1 | | | | | | |
| a source 1 | | | > | 8/8/16 11:27:56.000 AM | 1470680876, Entry, 4, Martha, Washington, Martha_Washington.jpg host= badgescan : source = badge_scans.csv : sourcetype = csv | |
| a sourcetype 1 | | | | | | |
| Interesting Fields | | | > | 8/8/16 11:26:46.000 AM | 1470680806, Entry, 2, Abraham, Lincoln, Abraham_Lincoln.jpg host= badgescan : source = badge_scans.csv : sourcetype = csv | |
| # date_hour 7 | | | | | | |
| # date_mday 3 | | | > | 8/8/16 11:26:46.000 AM | 1470680806, Entry, 2, Abraham, Lincoln, Abraham_Lincoln.jpg host= badgescan : source = badge_scans.csv : sourcetype = csv | |
| # date_minute 60 | | | | | | |
| # date_month 2 | | | > | 8/8/16 11:23:34.000 AM | 1470680614, Entry, 3, James, Madison, James_Madison.jpg host= badgescan : source = badge_scans.csv : sourcetype = csv | |
| # date_second 60 | | | | | | |
| a date_wday 2 | | | > | 8/8/16 11:23:34.000 AM | 1470680614, Entry, 3, James, Madison, James_Madison.jpg host= badgescan : source = badge_scans.csv : sourcetype = csv | |
| # date_year 1 | | | | | | |
| # date_zone 1 | | | > | 8/8/16 11:23:15.000 AM | 1470680595, Entry, 4, Thomas, Jefferson, Thomas_Jefferson.jpg host= badgescan : source = badge_scans.csv : sourcetype = csv | |
| a event 1 | | | | | | |
| a firstname 100+ | | | > | 8/8/16 11:23:15.000 AM | 1470680595, Entry, 4, Thomas, Jefferson, Thomas_Jefferson.jpg host= badgescan : source = badge_scans.csv : sourcetype = csv | |
| a headshots 100+ | | | | | | |
| a index 1 | | | > | 8/8/16 11:22:57.000 AM | 1470680577, Entry, 2, John, Adams, John_Adams.jpg host= badgescan : source = badge_scans.csv : sourcetype = csv | |
| a lastname 100+ | | | | | | |
| # linecount 1 | | | > | 8/8/16 | 1470680577, Entry, 2, John, Adams, John_Adams.jpg | |

FIG. 22

| cameraimage ◇ | distance_method_1 ◇ | distance_method_2 ◇ | firstname ◇ | headshots ◇ | lastname ◇ | time ◇ | turnstile ◇ |
|---|---|---|---|---|---|---|---|
| crop-turnstile2-4506740.0-7.jpg | 0.1199789050098836255 | 0.0180498686511156108 | Martha | Martha_Washington.jpg | Martha | 1470676505.0 | 2 |
| crop-turnstile2-4506740.0-7.jpg | 0.1199789050098836255 | 0.0180498686511156108 | Martha | Martha_Washington.jpg | Martha | 1470676505.0 | 2 |
| crop-turnstile3-2518686.0-9.jpg | 0.1555393640183114 | 0.0219207565566449436 | James | James_Madison.jpg | Madison | 1470674517.0 | 3 |
| crop-turnstile3-2518686.0-9.jpg | 0.1555393640183114 | 0.0219207565566449436 | James | James_Madison.jpg | Madison | 1470674517.0 | 3 |
| crop-turnstile3-2143210.0-5.jpg | 0.4299655955155571758 | 0.0222630330764731 | Andrew | Andrew_Jackson.jpg | Jackson | 1470674142.0 | 3 |
| crop-turnstile3-2143210.0-5.jpg | 0.4299655955155571758 | 0.0222630330764731 | Andrew | Andrew_Jackson.jpg | Jackson | 1470674142.0 | 3 |
| crop-turnstile3-640274.0-4.jpg | 0.1257772805892086 | 0.0223873821137589 | William | William_Harrison.jpg | Harrison | 1470672639.0 | 3 |
| crop-turnstile3-640274.0-4.jpg | 0.1257772805892086 | 0.0223873821137589 | William | William_Harrison.jpg | Harrison | 1470672639.0 | 3 |
| crop-turnstile3-2891058.0-17.jpg | 0.2876515757484528 | 0.0230500088952231526 | Franklin | Franklin_Pierce.jpg | Pierce | 1470674890.0 | 3 |
| crop-turnstile3-2891058.0-17.jpg | 0.2876515757484528 | 0.0230500088952231526 | Franklin | Franklin_Pierce.jpg | Pierce | 1470674890.0 | 3 |
| crop-turnstile3-1423290.0-20.jpg | 0.2286751400264525 | 0.0240579932426864 | John | John_Tyler.jpg | Tyler | 1470673422.0 | 3 |
| crop-turnstile3-1423290.0-20.jpg | 0.2286751400264525 | 0.0240579932426864 | John | John_Tyler.jpg | Tyler | 1470673422.0 | 3 |
| crop-turnstile3-4111612.0-4.jpg | 0.0277147077452214 | 0.0241723977155584978 | Ulysses | Ulysses_Grant.jpg | Grant | 1470676110.0 | 3 |
| crop-turnstile3-4111612.0-4.jpg | 0.0277147077452214 | 0.0241723977155584978 | Ulysses | Ulysses_Grant.jpg | Grant | 1470676110.0 | 3 |
| crop-turnstile3-2922089.0-4.jpg | 0.1958764334136257 | 0.0246140925983638 | Grover | Grover_Cleveand.jpg | Cleveland | 1470674921.0 | 3 |
| crop-turnstile3-2922089.0-4.jpg | 0.1958764334136257 | 0.0246140925983638 | Grover | Grover_Cleveand.jpg | Cleveland | 1470674921.0 | 3 |
| crop-turnstile2-390991.0-5.jpg | 0.4241501259874181 | 0.0251572120577448 | Theodore | Theodore_Roosevelt.jpg | Roosevelt | 1470672389.0 | 2 |
| crop-turnstile2-390991.0-5.jpg | 0.4241501259874181 | 0.0251572120577448 | Theodore | Theodore_Roosevelt.jpg | Roosevelt | 1470672389.0 | 2 |
| crop-turnstile3-2431799.0-19.jpg | 0.1355204686842080 | 0.0256441730355896 | Harry | Harry_Truman.jpg | Truman | 1470674430.0 | 3 |
| crop-turnstile3-2431799.0-19.jpg | 0.1355204686842080 | 0.0256441730355896 | Harry | Harry_Truman.jpg | Truman | 1470674430.0 | 3 |

FIG. 24

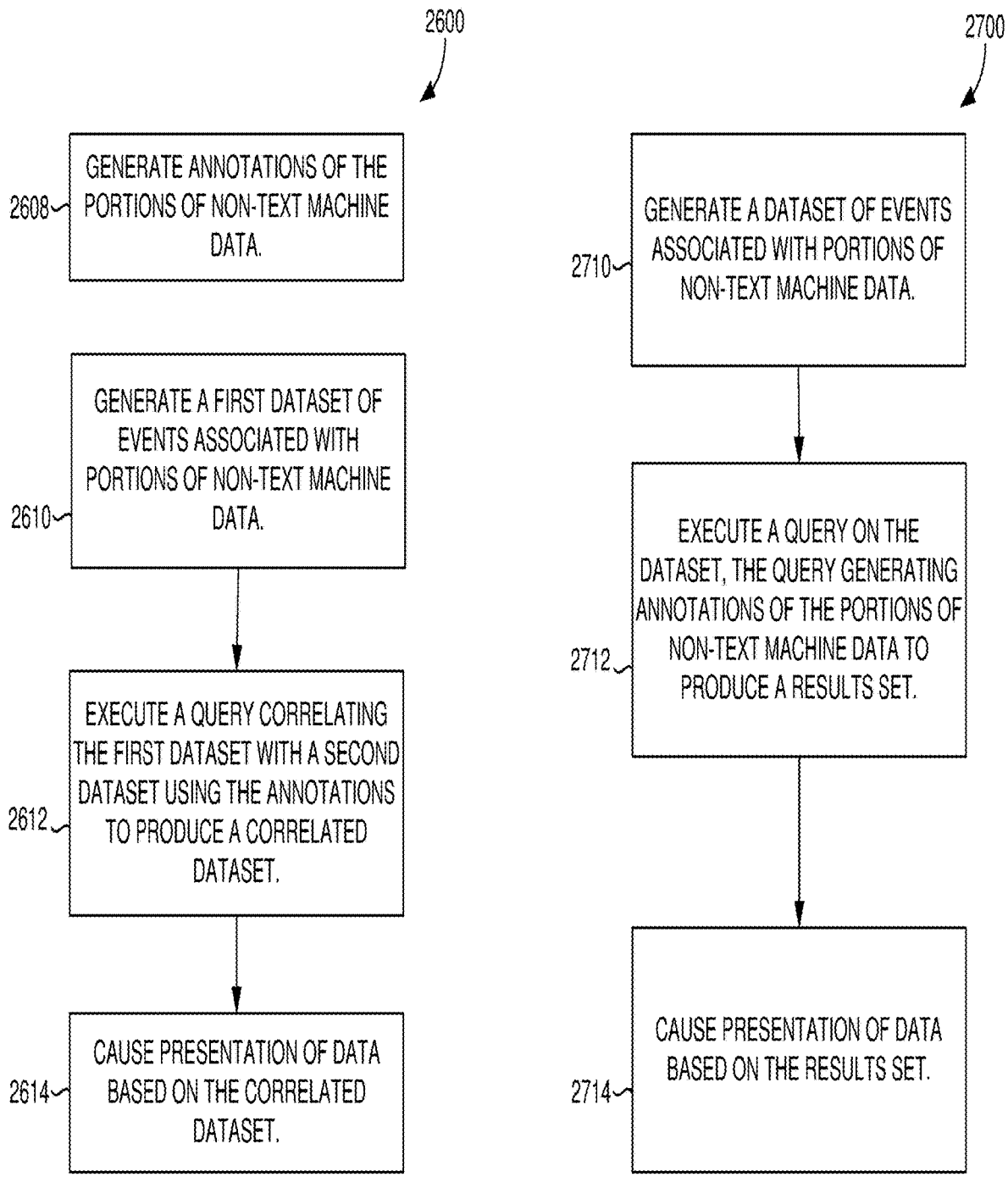

CORRELATING NON-TEXT MACHINE DATA USING EVENT FIELDS

CROSS-REFERENCE TO RELATED APPLICATIONS

This application is a continuation of U.S. patent application Ser. No. 15/824,473 filed on Apr. 28, 2017, which itself is a continuation of U.S. patent application Ser. No. 15/224,491, filed on Jul. 29, 2016. The entire contents of each are incorporated by reference herein.

BACKGROUND

A flood of machine-generated data (i.e., machine data) has come with the proliferation of computerized and automated devices and networks. Such data is typically automatically generated by computer processes, applications, computer systems, networks, and the like without the intervention of a human.

Some tools have been introduced to effectively and efficiently gather, monitor, track, index, and search a massive amount of machine data. Many of these tools employ a text-based index. This is true because a valuable portion of the machine data includes textual content. For example, log files contain textual content that describes automatically logged occurrences in the computer or network system. This textual content is used to index these logged occurrences. For example, the text-based index contains keywords derived from the textual content of the logged occurrences.

SUMMARY

The present disclosure is related to integrating non-text machine data into data intake and query systems. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

FIG. 6A illustrates a search screen in accordance with the disclosed embodiments.

FIG. 6B illustrates a data summary dialog that enables a user to select various data sources in accordance with the disclosed embodiments.

FIG. 9C illustrates a proactive monitoring tree in accordance with the disclosed embodiments.

FIGS. 12-14 illustrate a series of user interface screens for an example data model-driven report generation interface in accordance with the disclosed embodiments.

FIGS. 15-17 illustrate example visualizations generated by a reporting application in accordance with the disclosed embodiments.

FIG. 22 illustrates an interface screen suitable for event-based correlation of non-text machine data in accordance with the disclosed embodiments.

FIG. 24 illustrates an interface screen suitable for query time annotation of non-text machine data in accordance with the disclosed embodiments.

FIGS. 26 and 27 illustrate example methodological implementations in accordance with the technology described herein.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
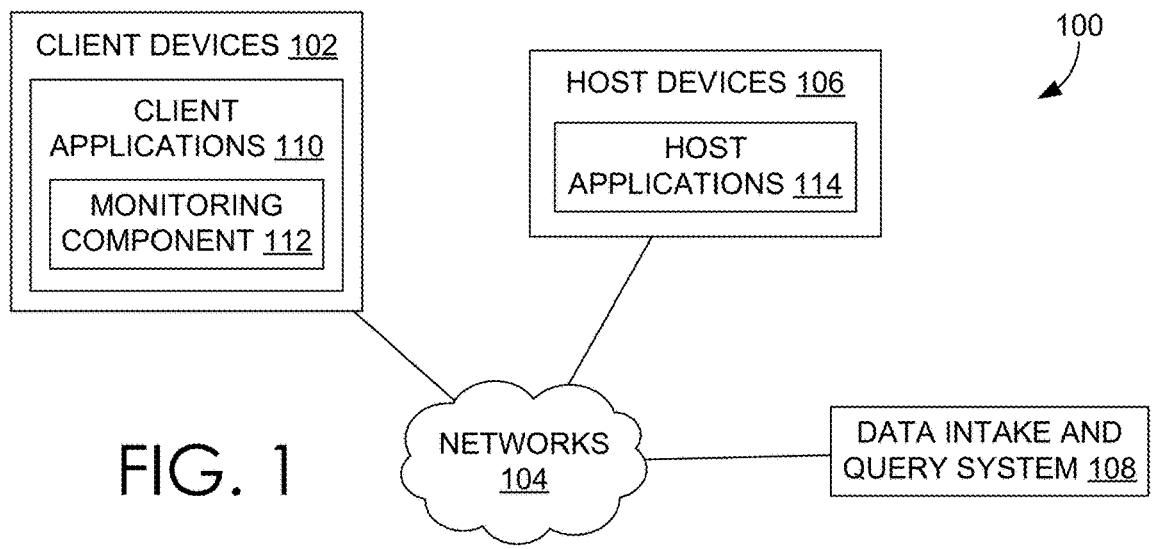
FIG. 1 illustrates a networked computer environment in which an embodiment may be implemented.

Embodiments are described herein according to the following outline:
   1.0. General Overview
   2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing 2.6. Query Processing
2.7. Field Extraction
2.8. Example Search Screen
2.9. Data Modelling
2.10. Acceleration Techniques
   2.10.1. Aggregation Technique
   2.10.2. Keyword Index
   2.10.3. High Performance Analytics Store
   2.10.4. Accelerating Report Generation
2.11. Security Features
2.12. Data Center Monitoring
2.13. Cloud-Based System Overview
2.14. Searching Externally Archived Data
   2.14.1. ERP Process Features
3.0 Event-based Data Intake and Query System Employing Non-Text Machine Data
   3.1 Non-Text Machine Data
   3.2 Example Non-Text Machine Data Processing System
   3.3 Example Search Screen with A/V Data Displayed
   3.4 Example Methodological Implementations
4.0 Additional Event-Based Technologies for Non-Text Machine Data
   4.1 Event-Based Correlation of Non-Text Machine Data
   4.2 Example Interface for Correlation of Non-Text Machine Data
   4.3 Query Time Annotation of Non-Text Machine Data
   4.4 Example Interface for Query Time Annotation of Non-Text Machine Data
   4.5 Illustrative Computer Operations
   1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 10 Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
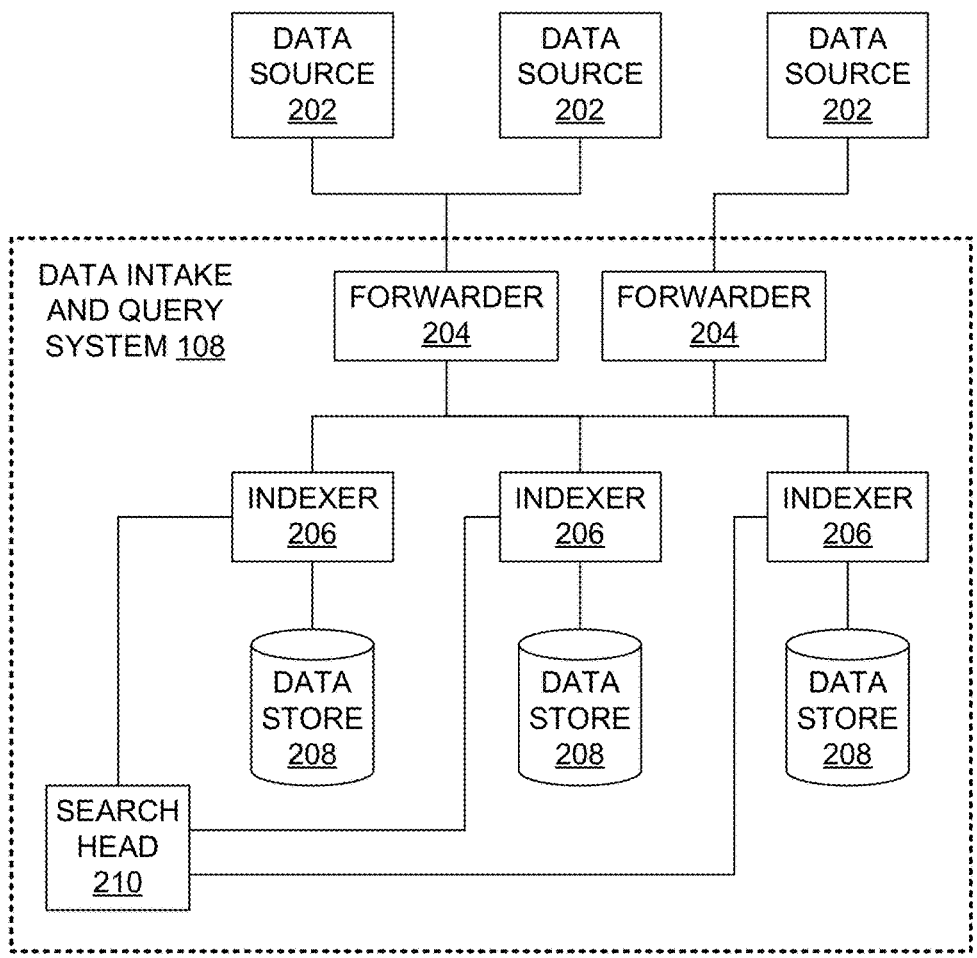
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate timestamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
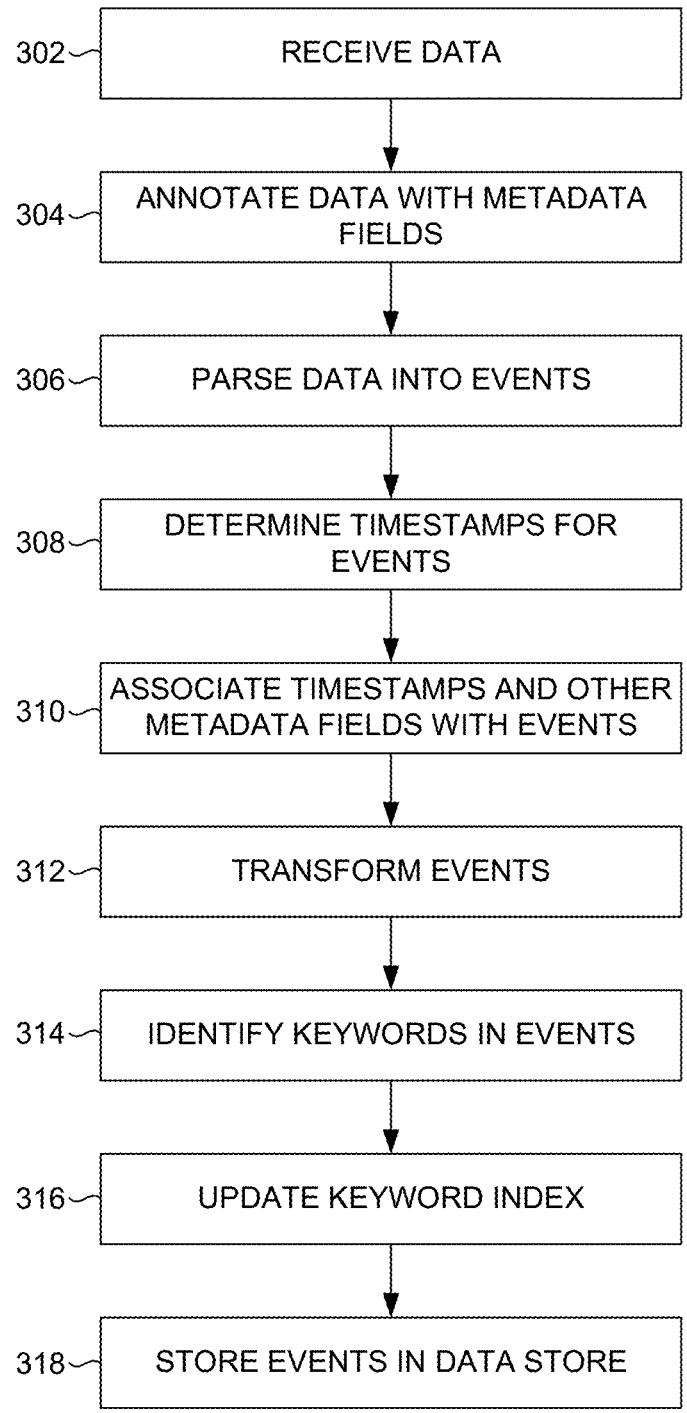
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a timestamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
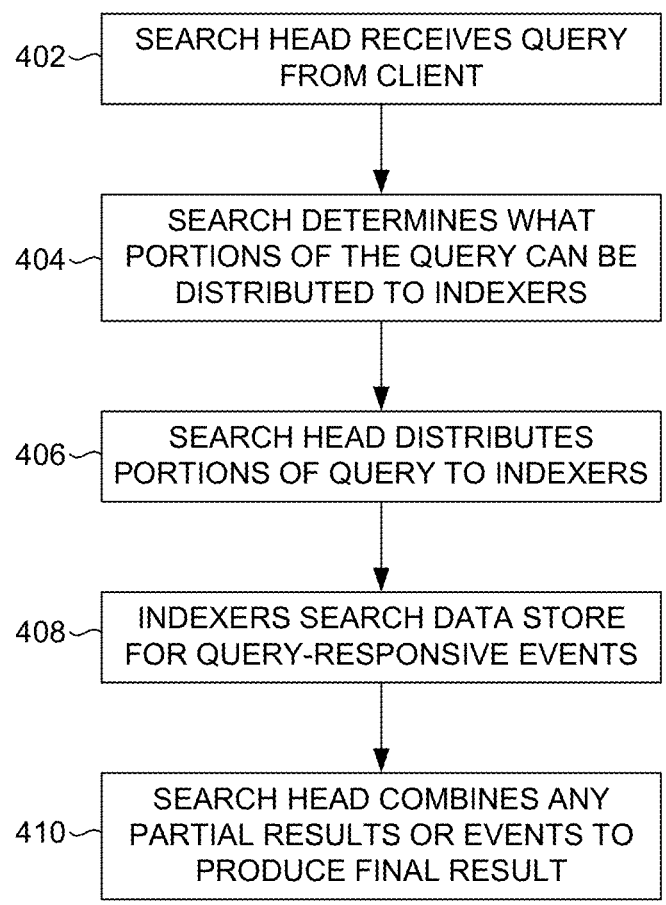
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event timestamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
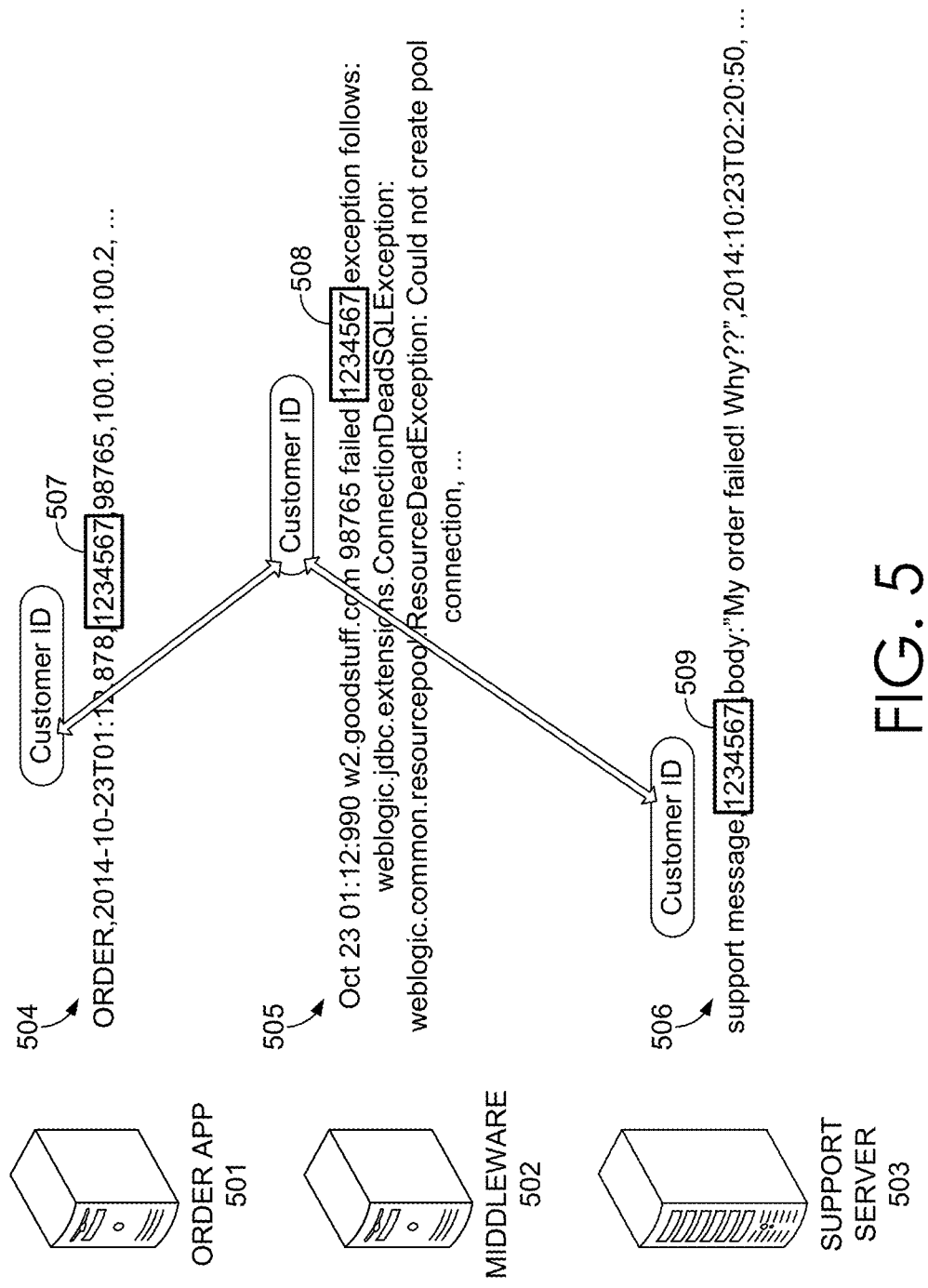
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
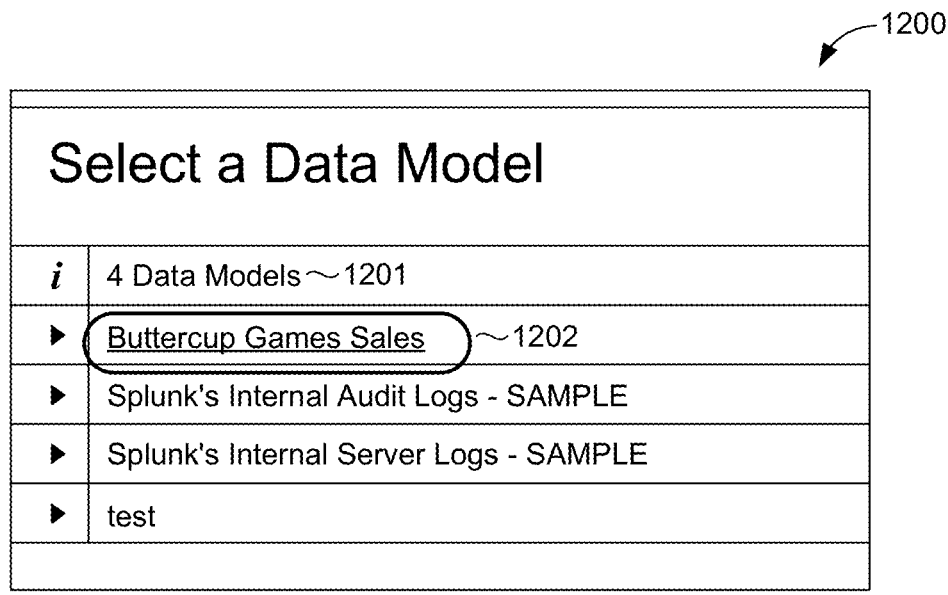

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
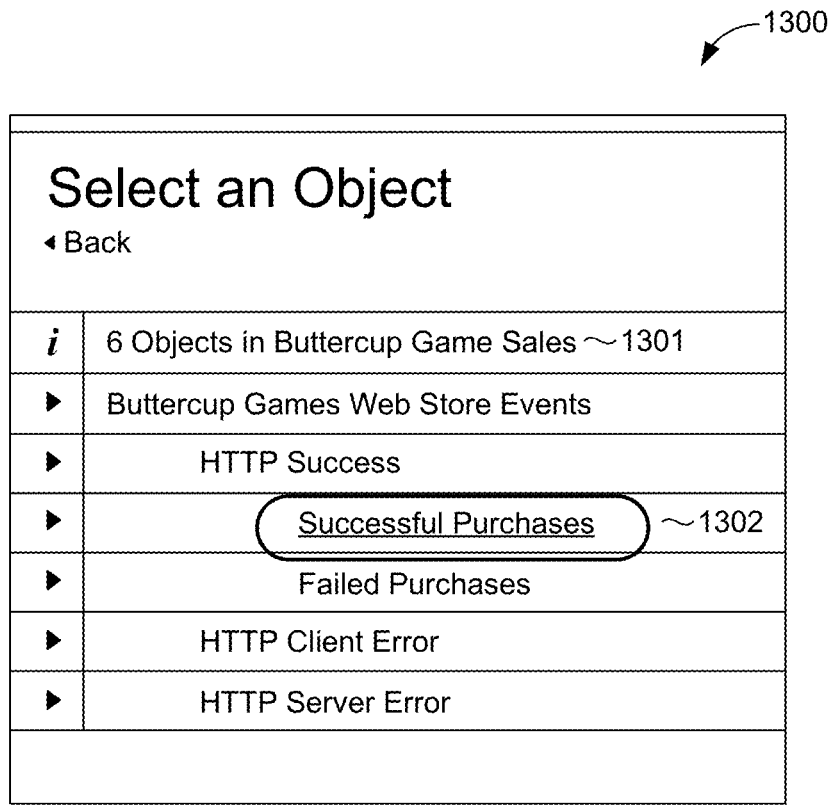

FIG. 13 illustrates an example data model object selection graphical user interface 1300 that displays available data objects 1301 for the selected data object model 1202. The user may select one of the displayed data model objects 1302 for use in driving the report generation process.

Figure 7A:
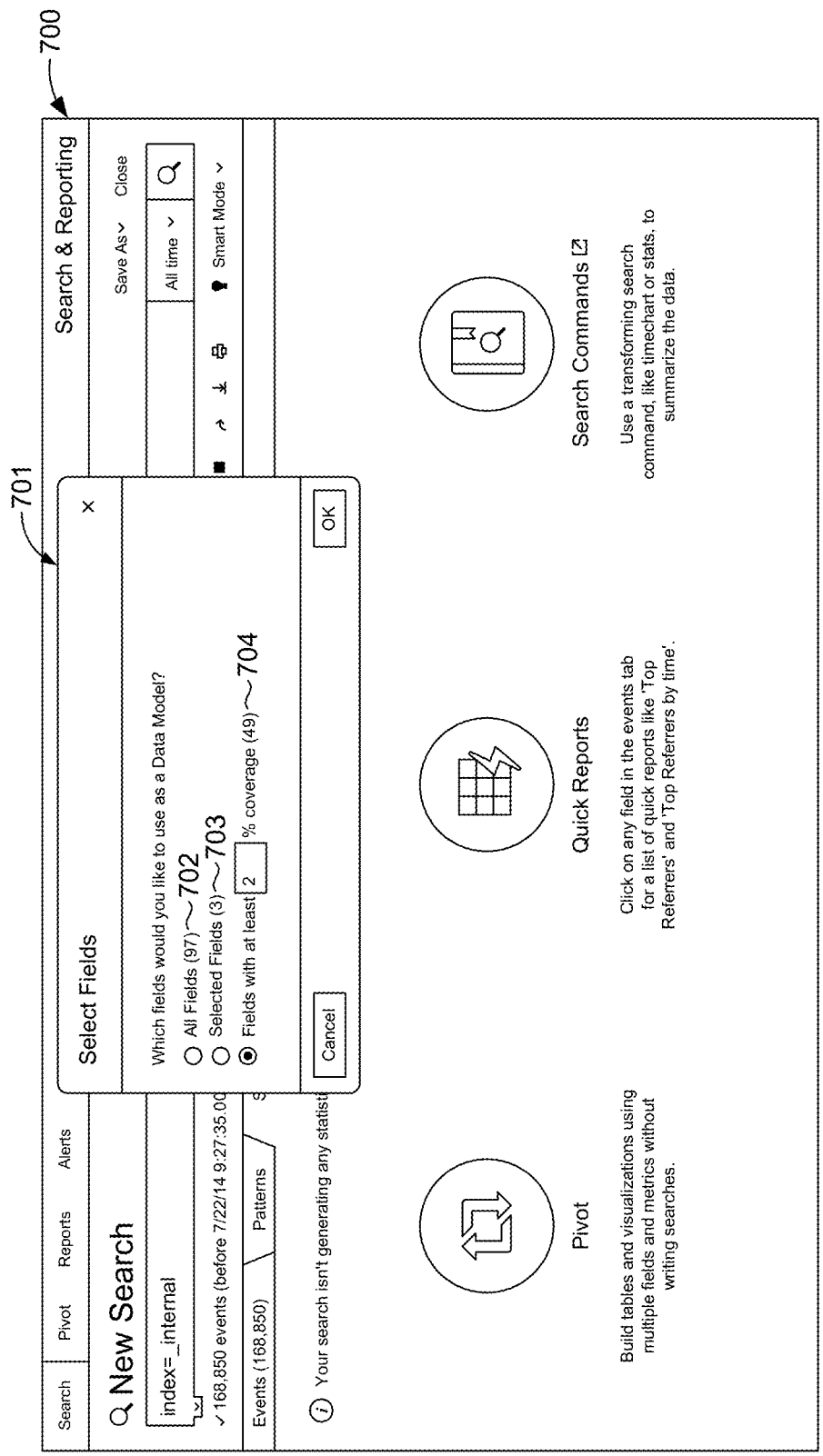
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
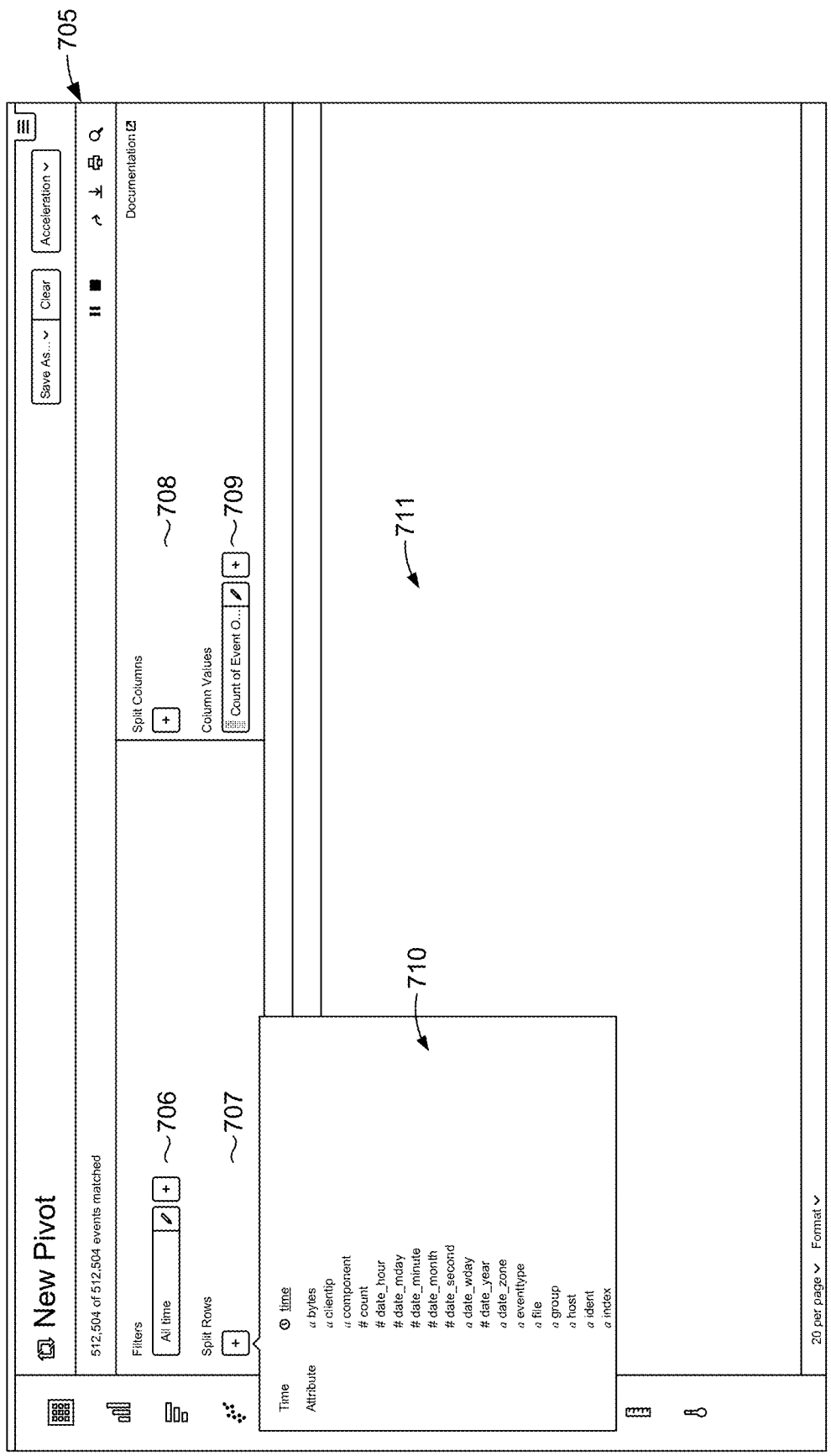
Figure 7C:
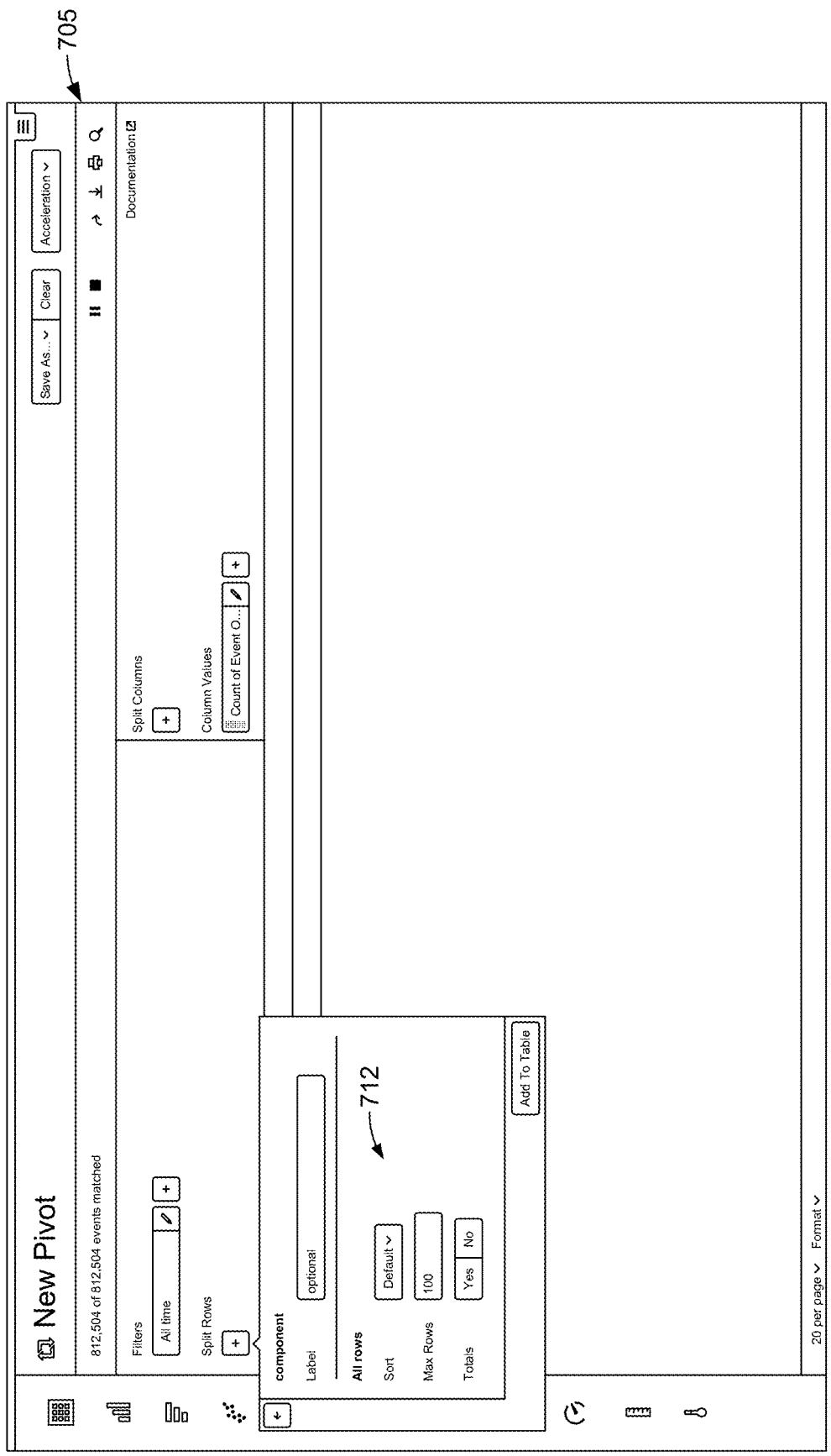

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
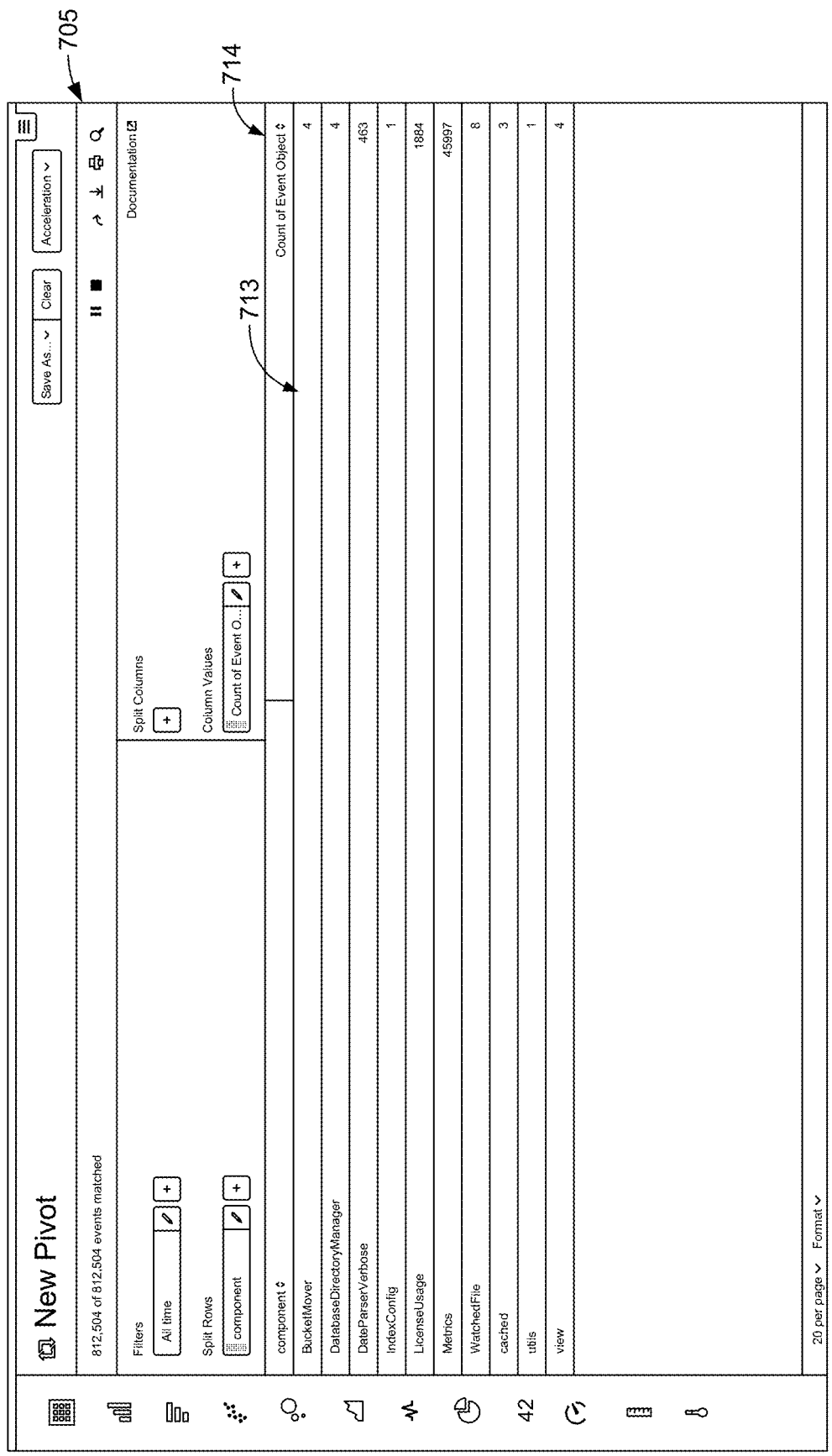

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 16:
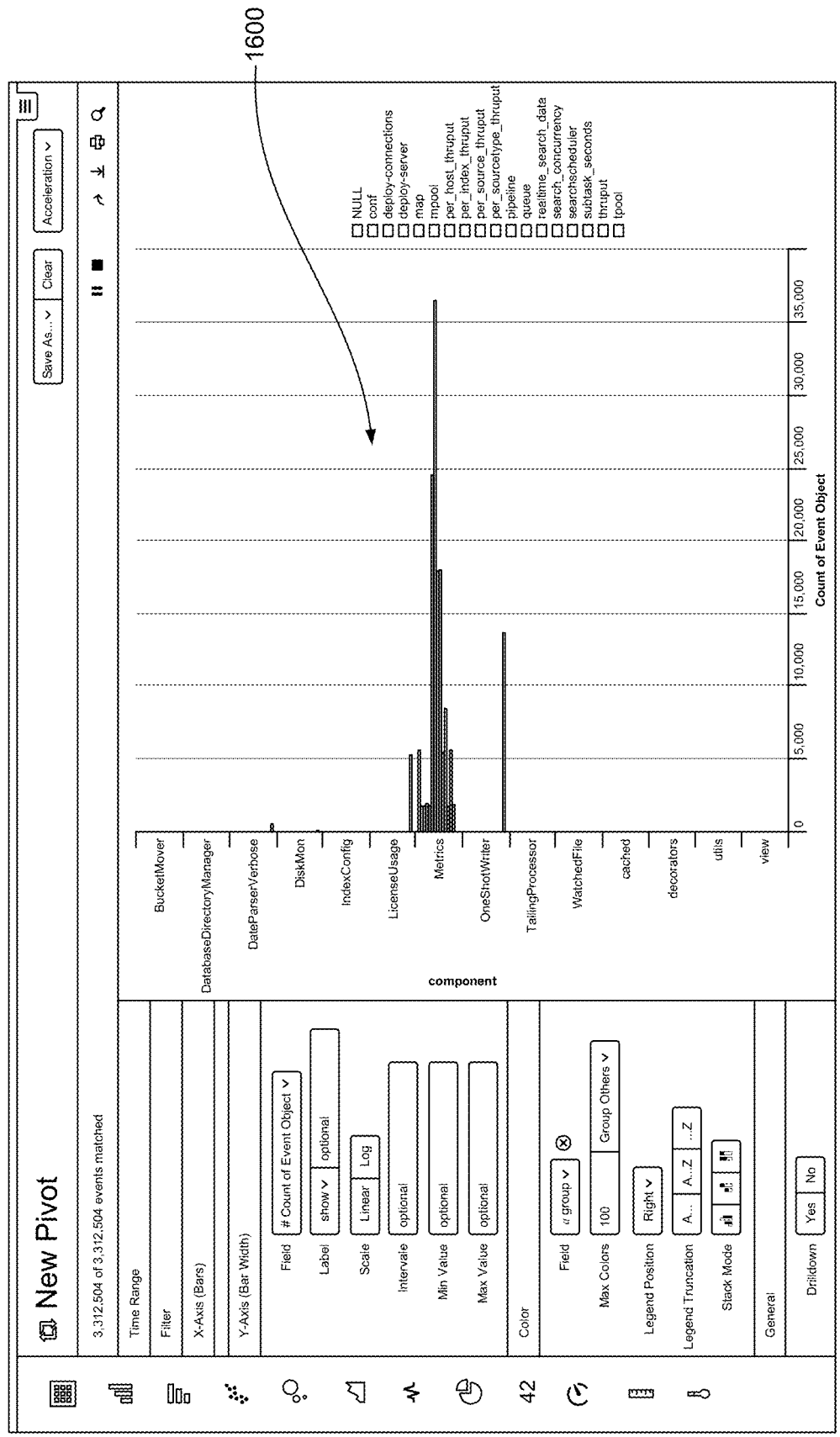
Figure 17:
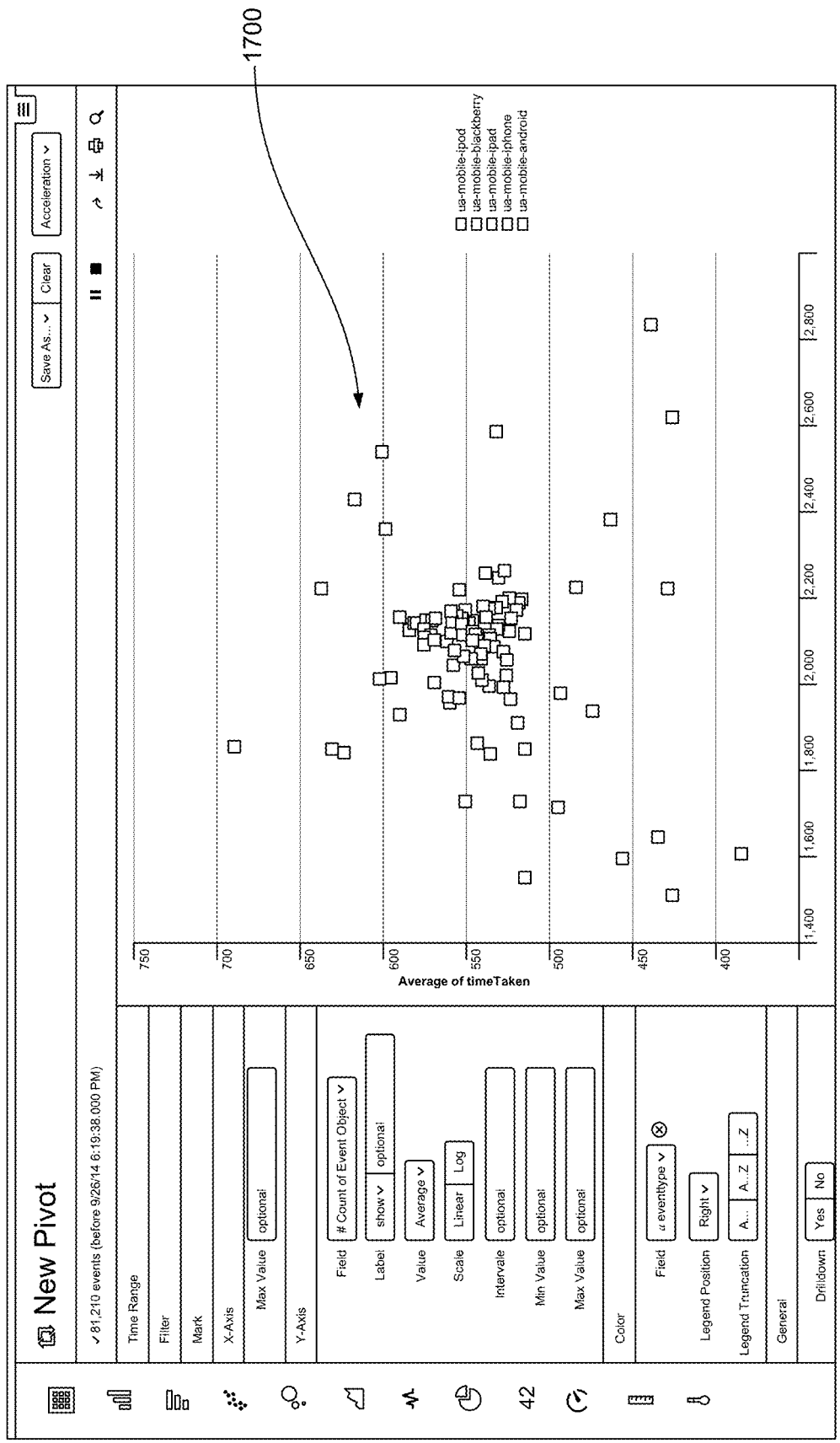

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
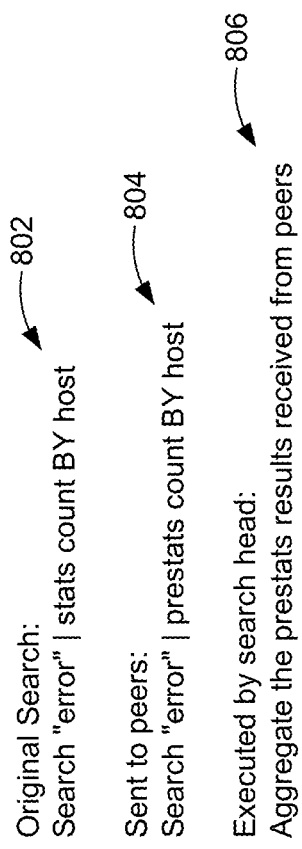
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
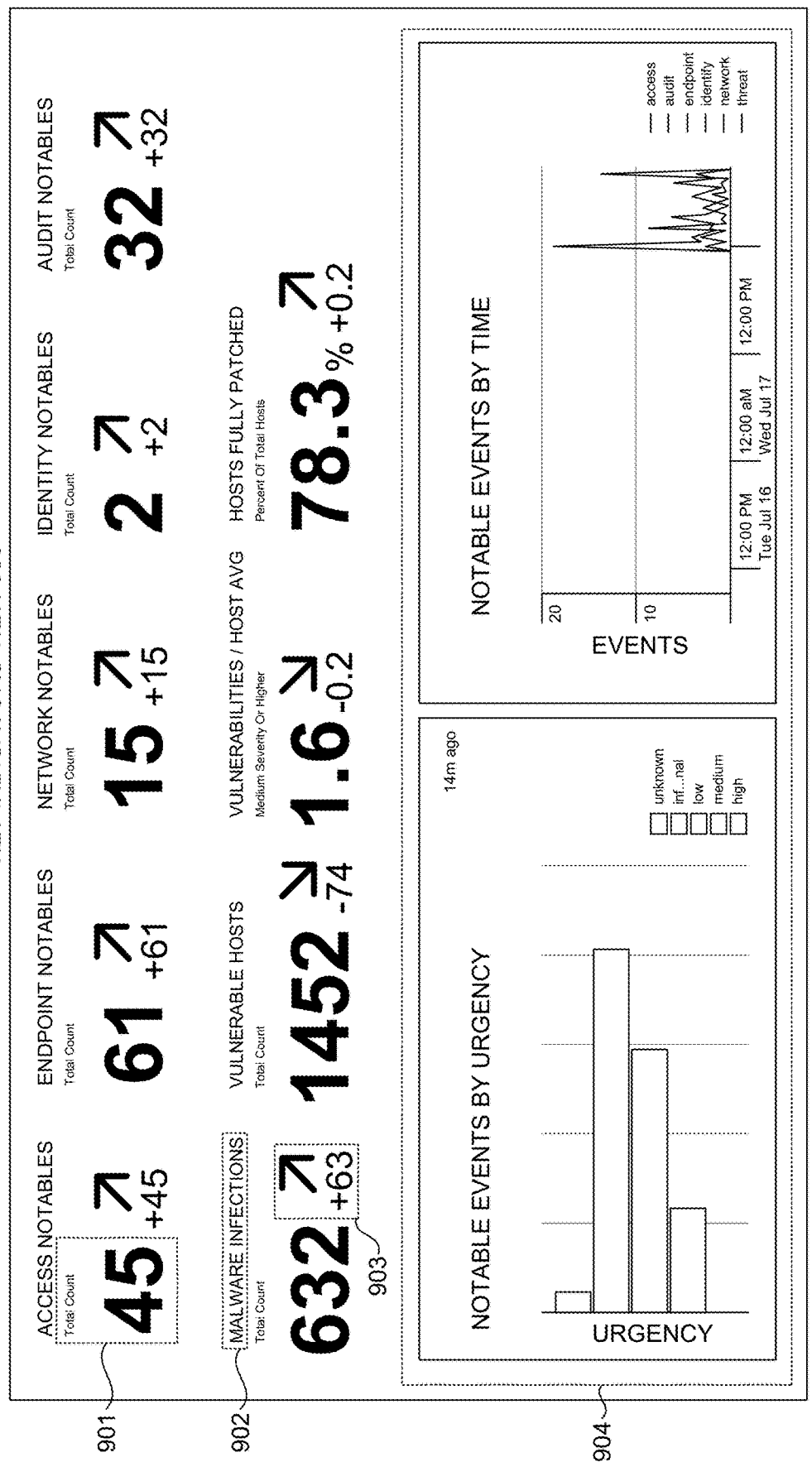
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
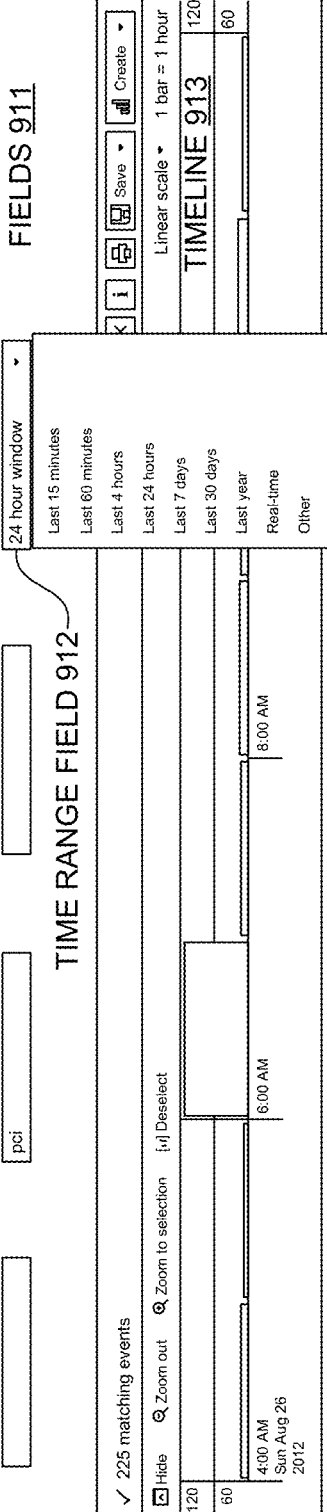
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
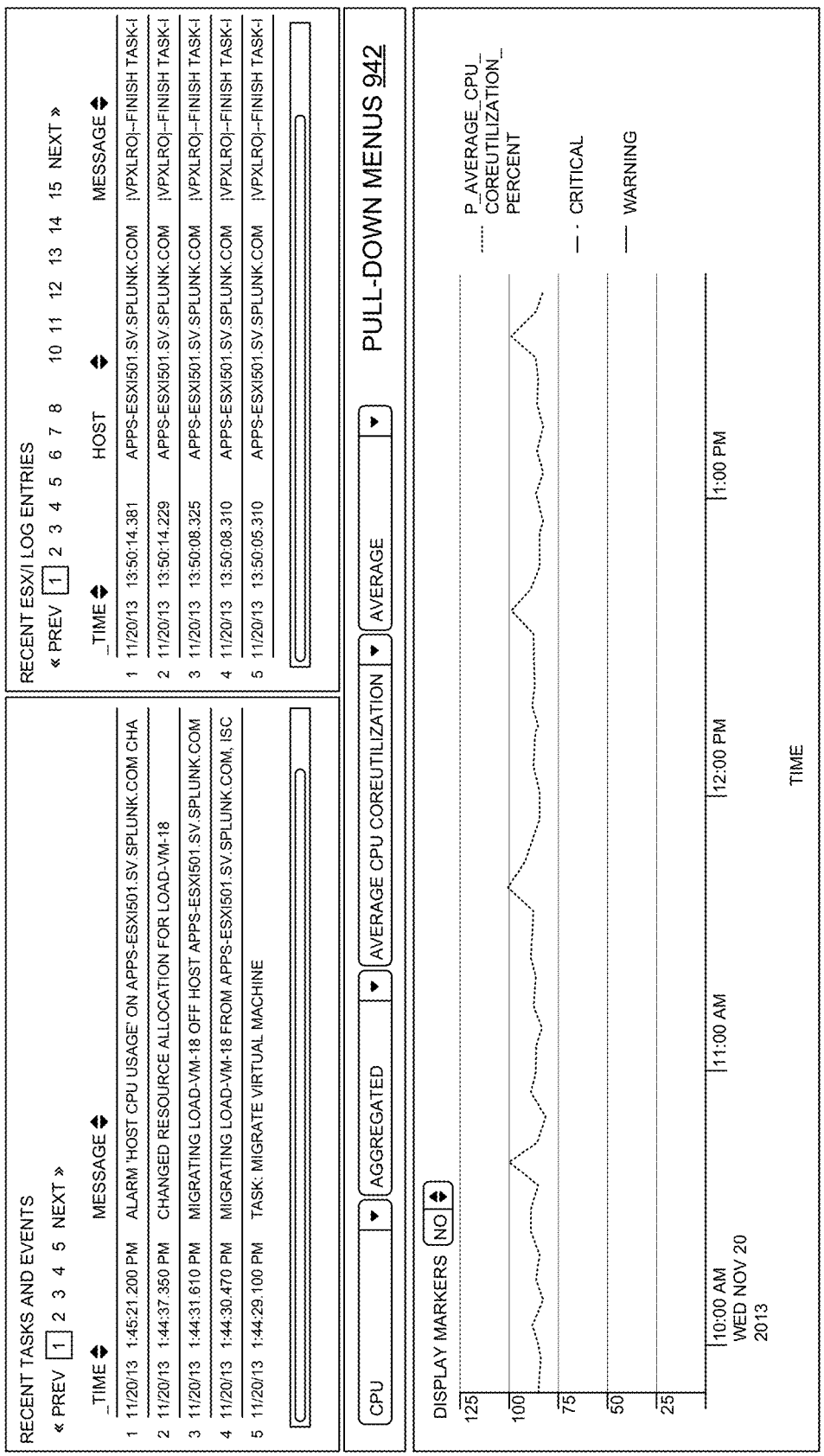
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
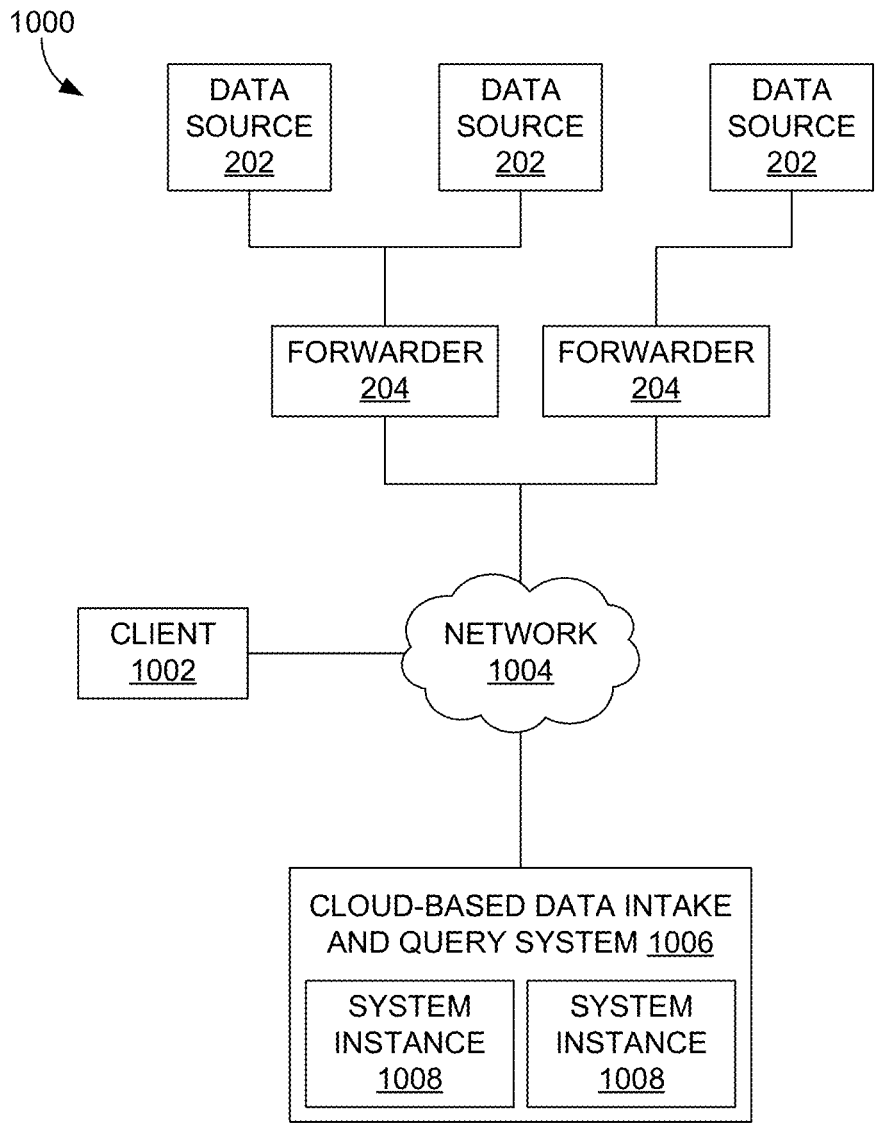
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
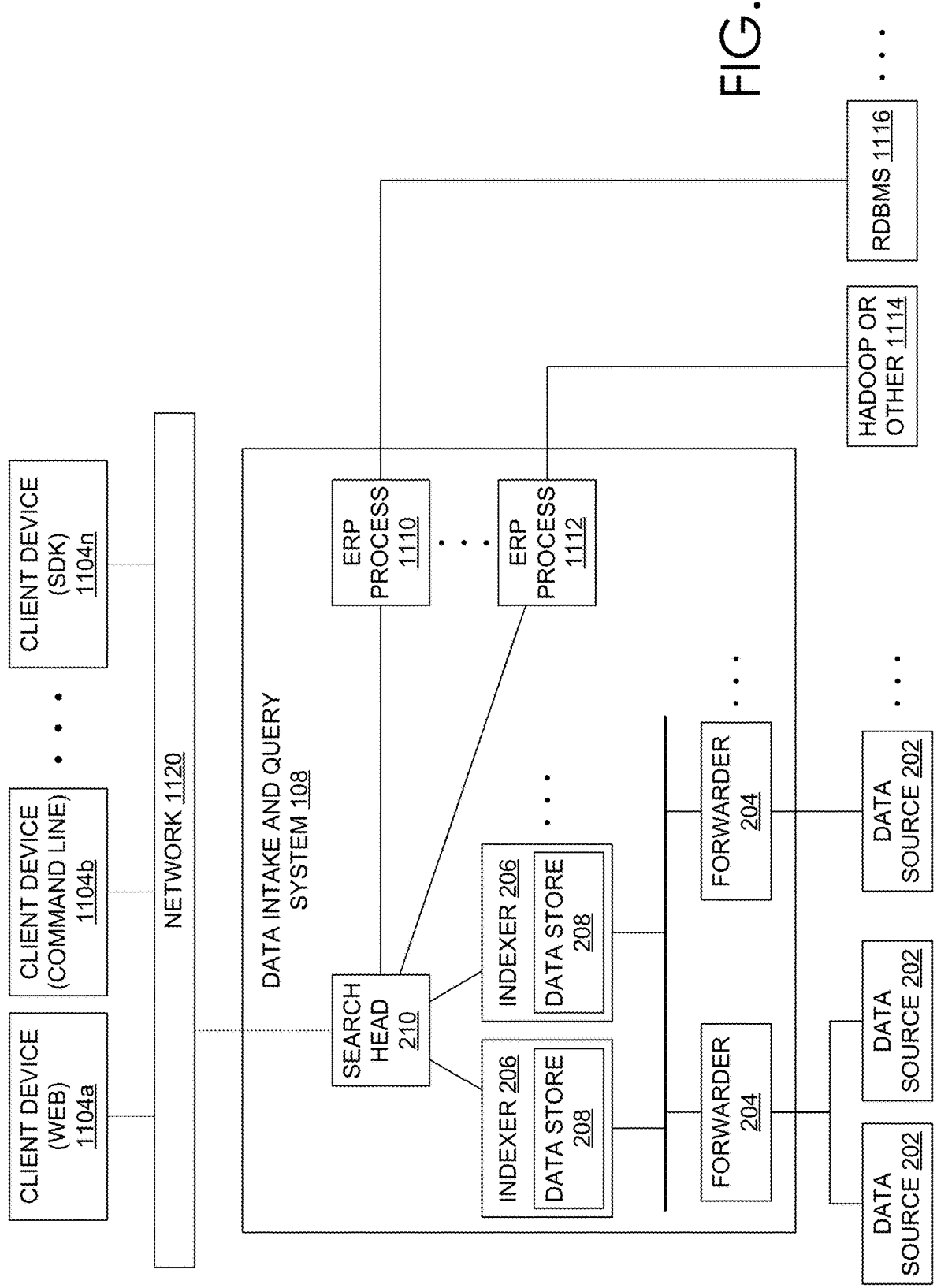
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results— when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, timestamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Event-Based Data Intake and Query System Employing Non-Text Machine Data

Described herein are technologies that facilitate effective use (e.g., indexing and searching) of non-text machine data with text-based indexes of an event-based machine-data intake and query system. Conventionally, event-based machine-data intake and query systems focused on text machine data. That is, machine data that contains textual content.

Because of this, the tools and components of such systems are designed to expect the textual content of the input machine data. Consequently, such systems create indexes of textual content and provide for searches on that textual content. With conventional approaches, non-text machine data was not available for effective use by event-based machine-data intake and query systems.

With some technologies described herein, non-text machine data is available and usable by such systems without changing the text-based nature of the tools and components of the typical event-based machine-data intake and query system. This can be accomplished, at least in part, by employing automated textual annotations to the non-text data and using those textual annotations as the basis for the text-based tools and components of typical event-based machine-data intake and query systems.

3.1 Non-Text Machine Data

In general, machine data is produced by a component within an information technology environment. While machine data is generated by a machine, much of it was intended to be an archive that was preserved for human to review at some point in time. As such, this type of machine data has textual content. For example, an error log contains details about errors when they occurred. Typically, it is a plain text file.

More generally, text machine data contains textual content. As used herein, an example of textual content is a collection of alphanumeric characters encoded in accordance with one or more alphanumeric encoding schemes or standards of a particular human language. Examples of alphanumeric characters include alphabetic characters in both cases (e.g., A, B, C, and a, b, c) and numerical characters (e.g., 1, 2, 3). Examples of alphanumeric characters also include symbols that are typically associated with letters and numbers, such as punctuation (e.g., ".", ",", etc.), space, and symbols (e.g., "%", "&", etc.).

One of the most common alphanumeric encoding schemes or standards is UNICODE of the UNICODE Consortium. The UNICODE standards offer a set of ubiquitous computing industry standards for the consistent encoding, representation, and handling of text expressed in most of the world's writing systems. Each standard consists of a set of code charts for visual reference, an encoding method, and set of standard character encodings, a set of reference data files, and some related items. Other examples common alphanumeric encoding schemes or standards includes American Standard Code for Information Interchange (ASCII) and Extended Binary Coded Decimal Interchange Code (EBCDIC).

As measured in bytes, the majority of the machine data does not contain textual content. Herein, such data is called non-text machine data. Examples of non-text machine data include surveillance video, customer service phone calls, medical imaging, computer-aided design (CAD), electronic design automation (EDA), graphical information organizer files, raster graphics, vector graphics, 3D graphics, scientific data exchange, security files (e.g., encrypted files), signal data (non-audio), video game data and storage media, and programs (e.g., object code, executable files, shared and dynamically linked libraries).

Of course, there any many different file formats that store a mix of both text and non-text data. For example, LaTeX, portable document format (PDF), spreadsheet documents are a mix of both text and non-text data. Indeed, they are more like computer programs than a text document. With compressed or archived documents, often the text data has been highly modified and thus unrecognizable as text. For one or more embodiments, the non-text machine data is the portion of the files of the mixed data types that is not text and/or where the text is not recognizable without a necessary decoder, decrypter, etc.

A particularly interesting broad category of non-text machine data is audio and visual data. Herein, this is called A/V machine data. As the name suggests, such data includes audio and/or visual content (i.e., A/V content). Examples of A/V data includes a recording of a customer service call, a clip of a surveillance video of a retail store, surveillance images of cars passing through a toll booth, X-ray images, and the like.

3.2 Example Non-Text Machine Data Processing System

Figure 18:
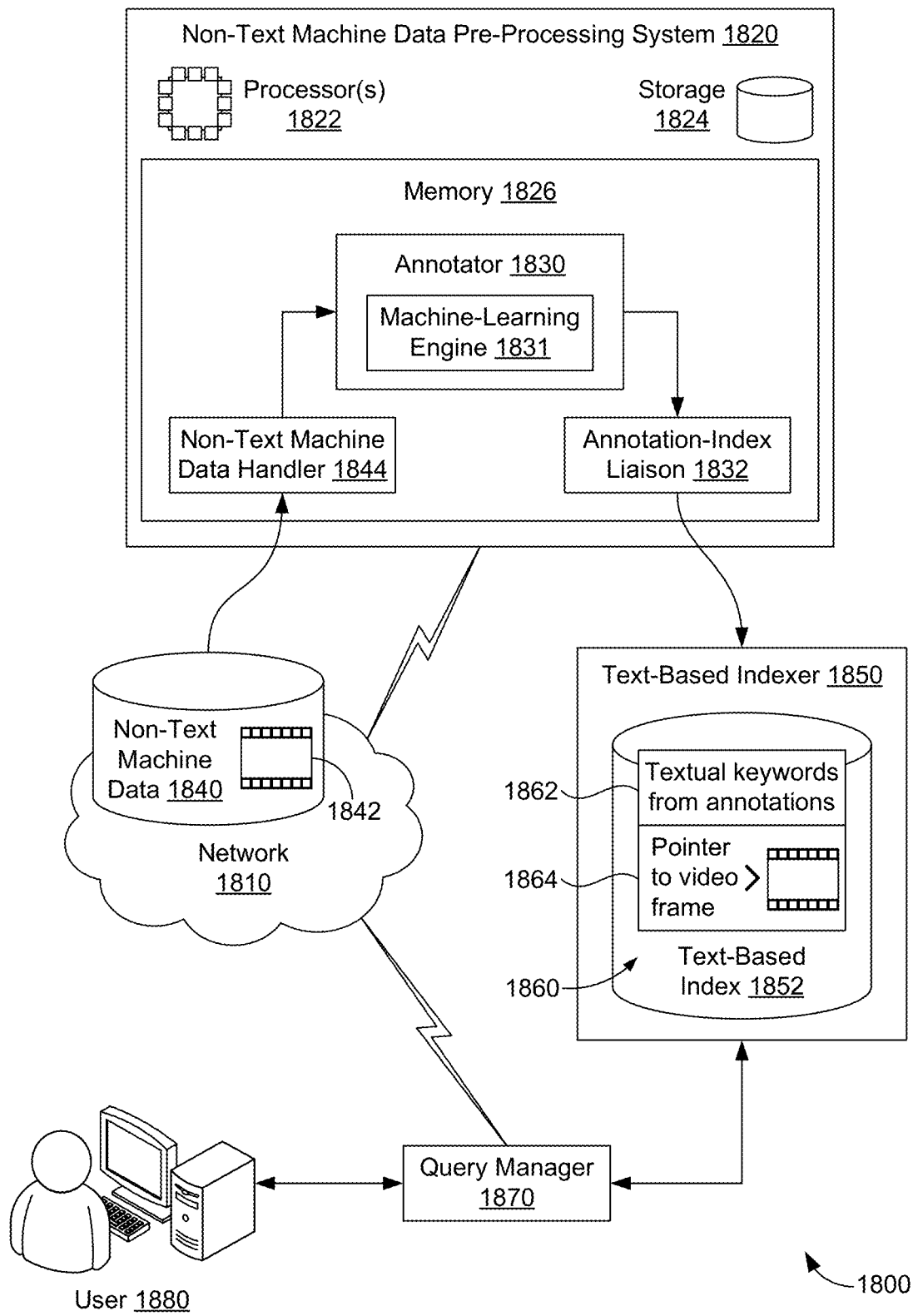
FIG. 18 illustrates an example computing infrastructure that employs a non-text machine data processing system in accordance with one or more implementations described herein.

FIG. 18 illustrates an example computing infrastructure 1800 that employs a non-text machine data processing system 1820 in accordance with one or more implementations described herein. The computing infrastructure 1800 may be implemented as part of a computing environment described above. For example, the computing infrastructure 1800 may be implemented as part of or as an extension to the data intake and query system 108. Indeed, the computing infrastructure 1800 may be implemented as part of or as an extension to an indexer or forwarder.

As depicted, the computing infrastructure 1800 includes a network 1810, the non-text machine data processing system 1820, non-text machine data 1840, text-based indexer 1850, and a query manager 1870. Of course, there may be an ultimate human user 1880 that may initiate a query request.

The network 1810 represents any one network or combination of multiple different types of networks that are used for communications to/from external devices and systems. Physically, the network 1810 includes wire-based networks (e.g., Ethernet, cable, dial-up telephone cabling, fiber optics, etc.) and/or wireless networks (e.g., wireless access points, cellular, satellite, BLUETOOTH™, etc.). The network 1810 may be described in a similar manner as network 104 above is described.

As depicted, the non-text machine data processing system 1820 includes one or more processors (or cores) 1822, one or more secondary storage systems 1824 (e.g., hard drives, flash memory), and one or more primary memories 1826 (e.g., caches, registers, random access memory, etc.). While the storage systems 1824 are shown as a local to the device (i.e., the non-text machine data processing system 1820), the storage systems 1824 may also be accomplished using non-local storage solutions, such as a so-called "cloud" storage. The storage systems 1824 and memories 1826 are examples of non-transitory computer-readable media that are capable of storing processor-executable (or computer-executable) instructions thereon.

The non-text machine data processing system 1820 is depicted as a computing device. While depicted as a particular hardware device, the non-text machine data processing system 1820 may be implemented as part of a computing device, a collection of networked computing devices, components, some portion of a component operating on or by such a device, or as a combination of hardware with a programmed software module.

The non-text machine data processing system 1820 includes several modules/components to perform it functions. Those include an annotator 1830, non-text machine data handler 1844, and annotation-index liaison 1832.

As shown, non-text machine data 1840 is stored on an external storage system. That is, it is stored external to the non-text machine data processing system 1820. Of course, in other implementations, the non-text machine data 1840 might be delivered (i.e., streamed) to the data processing system 1820 contemporaneously with its creation. For example, the data processing system 1820 may receive a live feed of a security video as the non-text machine data 1840. Of course, the live feed may be stored in an appropriate storage location as well. As depicted, the non-text machine data 1840 includes a particular type or category of such data. Indeed, video data 1842 is part of the non-text machine data 1840.

The non-text machine data handler 1844 (i.e., data intake handler) is designed to obtain the non-text machine data 1840. As a particular example, the non-text machine data handler 1844 receives the video data 1842 as part of the non-text machine data 1840. The non-text machine data handler 1844 may receive this data many different ways. It may be loaded via external memory devices (such as flash memory cards), from a direct link to another computer system, and/or via the network 1810.

In some implementations, the non-text machine data handler 1844 copies the non-text machine data 1840 and stores that copy at a different storage location (such as storage system 1824 or somewhere on the network 1810). This copy of the data may be used instead of the original to make sure that the machine data is available later when needed.

The non-text machine data handler 1844 may do some initial or early analysis of the incoming machine data. For example, the non-text machine data handler 1844 may evaluate and determine the type and/or format of the non-text machine data. For example, the handler may determine that the content of the machine data is video, audio, still images, multimedia presentation, etc. The handler may further determine the format of the non-textual content. For example, it may determine that the video is in the file format of Audio Video Interleave (AVI), Quicktime File Format, Windows Media Video, MPEG-4, etc.

Based upon this determination, the non-text machine data handler 1844 may select the tools of the of the annotator 1830 to be used based upon the type of non-text machine data that it identifies. Also, the non-text machine data handler 1844 may convert the format of the non-text machine data into a different format. In some implementations, the tools of the annotator 1830 may have a limited number of file formats on which they accept and operate. Thus, for example, the handler may convert non-text machine data with video content to a common video format, such as MPEG-4.

The annotator 1830 includes a combination of one or more tools that are each designed to operate on particular types of non-text machine data. These tools may identify and/or recognize semantic features of the non-text machine data. For example, a tool may recognize a human face in an image.

The annotator 1830 receives the non-text machine data 1840 via the non-text machine data handler 1844. On its own, with the aid of the data handler 1844, and/or with other additional assistance (e.g., human direction), the annotator 1830 selects the appropriate tools to operate on the type/kind of non-text machine-data that it receives. The tool analyzes the data, recognizes features, and provides automated labels for the recognized features.

For example, some tools may extract basic metrics or properties (e.g., brightness, hue, size, resolution, etc.). These metrics or properties can be used in textual and/or numeric annotations. As depicted in FIG. 18, the annotator 1830 may include a machine-learning engine 1831. Such an engine may employ tools that utilize machine learning and/or deep learning technology.

For example, the machine-learning engine 1831 may include a speech-to-text tool that analyzes the audio content of the non-text machine data. The tool identifies the speech of the audio content, and it produces a textual representation of that speech. Then the annotator 1830 associates portions of the text with the appropriate portions of the audio content where the transcribed speech occurred. Thus, the text data is annotated to particular portions or segments of the machine data.

Object recognition is another example of a machine-learning tool that may be used by the annotator 1830. Object recognition describes the task of finding and identifying objects in an image or video sequence. For example, the tool may recognize a dog in an image and textually annotate the photograph accordingly.

Most computer vision techniques may be employed by tools used by the annotator 1830. Some tools may use facial recognition to determine if any human face is in a video sequence or to identify a particular human. Some tools may use motion detection to determine if there is motion in a video sequence. Other tools may utilize scene/story techniques with video data.

In some implementations, some of the annotations may be derived, in part, by a collection of people using crowdsourcing technology. For example, crowdsourcing may be used to produce transcripts of audio or video content. In that situation, there may be a temporal delay between the generation or collection of the non-text machine data and the generation and indexing of the annotations.

The annotator 1830 annotates the annotation content to the non-text machine data by forming an association with the annotation content and the non-text machine data. In some implementations, that association may be in the form of metadata for the non-text machine data. However, with one or more implementations, the annotation may be stored in one or more separate but associated text files.

In some implementations, the annotator 1830 associates the annotations with particular segments of the non-text machine data. More particularly, the association is with a particular segment that is most relevant to the source or origin of the annotation content of the annotation. For example, a facial-detection tool may recognize a face at frame X of a video sequence. The text "face", "person", or the like may be associated with frame X of the video sequence. As another example, a luminosity determiner tool may analyze frame X of the video sequence and determine a luminosity value of the frame based on the analysis. A text of numerical value representing the luminosity value can be associated with frame X.

The annotation-index liaison 1832 receives the annotations for the non-text machine data 1840. It produces a link or reference to the non-text machine data 1840 associated with the annotations. More particularly, the annotation-index liaison 1832 generates a reference or link to particular portion or segment of the non-text machine data 1840 from which the tools produced particular annotations.

A URL or URI (universal resource identifier) is an example of reference or link, as used herein. The reference is textual information. The link or reference may also be called a pointer or backpointer. The link/reference/pointer to a particular segment (e.g., frame grab) of non-text data (e.g., a video) may include a URL to the storage location of the video itself plus a timestamp for the location of the particular frame grab. The link, reference, pointer, and the like described herein may be accomplished in a manner known to those of ordinary skill in the art.

Consider, for example, that video 1842 is a surveillance video that contains sequences where a person walks into frame. The textual annotation of "man" and "person" are associated with those sequences. The annotation-index liaison 1832 produces links or references to the video sequences (and/or perhaps to particular frames of those sequences).

Along with other information (e.g., timing information), the annotation-index liaison 1832 sends annotations and their associated links/references to the text-based indexer 1850. Note, that the liaison does not send and the indexer does not receive the non-text machine data itself.

With one or more implementations, the annotation-index liaison 1832 generates events in accordance with the event-based machine-data intake and query systems discussed herein. The events are based on the non-text machine data. More particularly, the event is generated based on the annotations for the non-text machine data and/or timing information (e.g., timestamp).

For example, the annotation-index liaison 1832 generates an event for "face" based on facial-recognition tool annotating the term "face" for a segment of video sequence when a person faces a surveillance camera. In generating the event, the liaison uses a timestamp based upon where that face-recognized segment occurs in the video sequence.

With an audio file, the annotator 1830 creates a transcript of the audio content of the audio file using speech-to-text technology and may produce an example event like this (with start_time and end_time representing timestamps):
_time start_time end_time transcript="The magic ML smoke has escaped from my Splunk."

With video file, the annotator 1830 extracts some metrics above the video or perhaps more complex captions from the video frames or sequences may produce an example event like this (with source_time representing timestamps):
_time source_time objects=man,car luminosity=0.7

With images (e.g., medical scan), the annotator 1830 learns the difference between healthy and unhealthy medical images (after training on a large number of examples) and may produce an example event of assigned scores like this:
source_image type=MRI anomaly_score=0.99

The text-based indexer 1850 generates and manages the text-based index 1852. In one or more implementations, neither the indexer 1850 nor the index 1852 itself includes or manages non-text data. Rather, it uses, manages, storage, and organizes text data.

Based on what the text-based indexer 1850 receives from the annotation-index liaison 1832, it generates or adds to the text-based index 1852. More particularly, the text-based indexer 1850 produces new index entries based on the received textual annotations. This may include a generation of keywords. Then the text-based indexer 1850 stores an association between the indexed textual annotations and the reference (or pointer) to the non-text machine data (or some portion or segment thereof).

Based on this, the text-based indexer 1850 produces new entries in the text-based index 1852. Each entry has one or more words (e.g., keywords) derived from the textual annotations and an associated reference (or pointer) to the non-text machine data (or some portion or segment thereof).

For example, entry 1860 includes two fields. The first field 1862 includes the one or more textual keywords from the annotations (e.g., "man"). The second field 1864 includes a pointer (e.g., reference) to a particular video frame of video 1842 that contains the associated one or more textual keywords from the annotations (e.g., "man") of field 1862.

FIG. 18 shows a user 1880 submitting a text-based search request via the query manager 1870 to a text-based index 1852. For example, the user may form a search request to find all documents having the word "man" in them. The user 1880 will receive results for events corresponding to non-text machine data. However, using conventional approaches, the user 1880 could not search non-text machine data in the same way or at all.

With the technology described herein, the user 1880 submits a text-based search request via the query manager 1870 to the text-based index 1852. For example, the user may form a search request to video frame grabs related to "man." However, unlike last time, the user 1880 receives results that include a link to non-text machine data, such as frame grabs from video 1842.

In some implementations, other advanced analytical capabilities of an advanced data intake and query system may be employed on non-text machine data. For example, when a list of objects in video frames are being indexed, an advanced data intake and query system can run anomaly detection on those object labels that indicate when a frame or series of frames contains unusual objects. In another example, an implementation may generate numerical annotations (like luminosity). In that example, an advanced data intake and query system can apply forecasting methods to detect when a sequence of images is trending brighter or darker (e.g., looks like night is approaching or cloud cover has moved in). Indeed, some implementations may use the visualization and report functions of an advanced data intake and query system.

3.3 Example Search Screen with A/V Data Displayed

Figure 19:
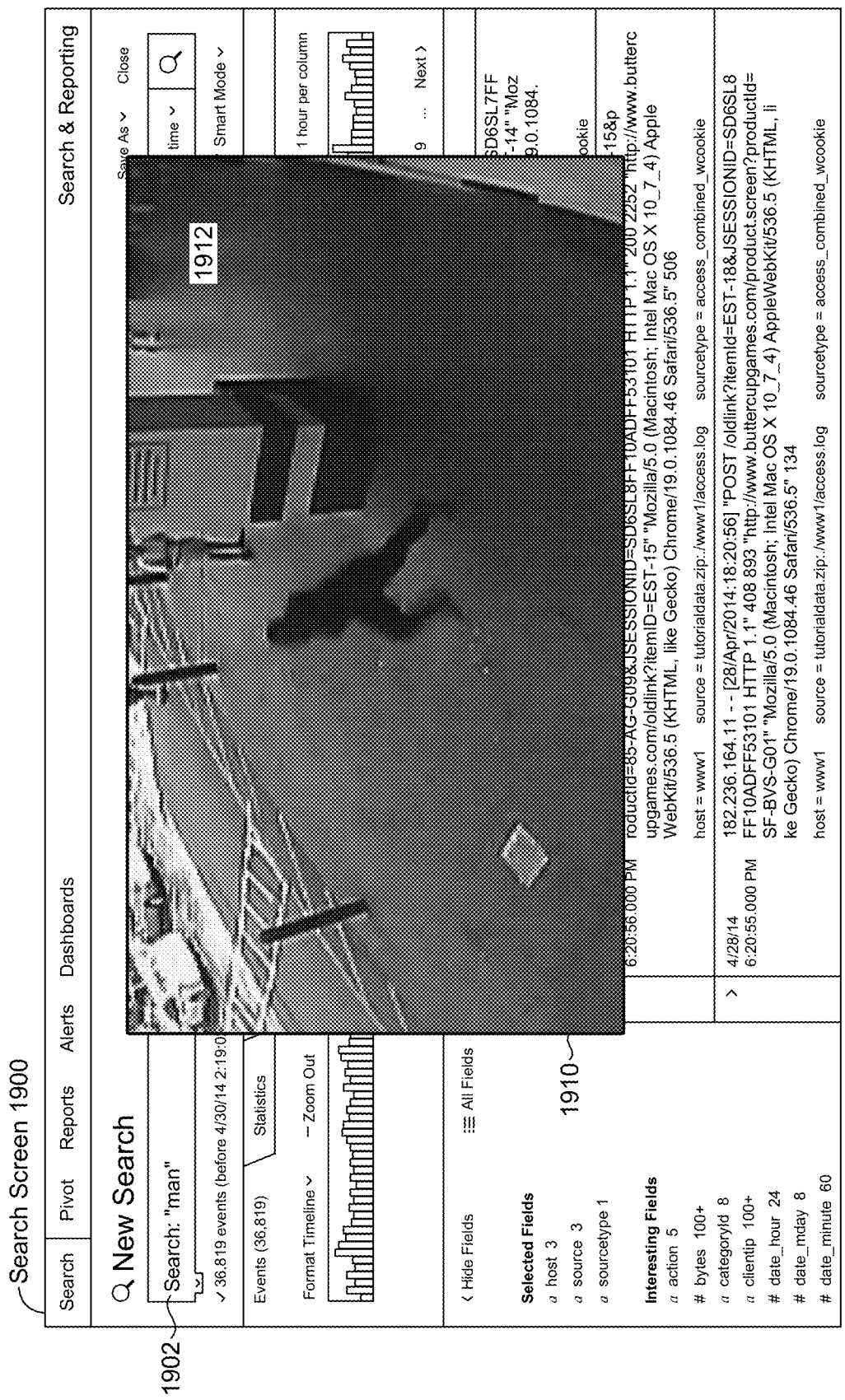
FIG. 19 illustrates a search screen that displays non-text machine data as part of the search results in accordance with the disclosed embodiments.

FIG. 19 shows an illustration of an example user-interface (UI) of a search screen 1900 in accordance with the disclosed embodiments. This search screen 1900 is consistent with the example search screen 600 described above and in a relationship with FIG. 6A.

The search screen 1900 includes a search bar 1902 that accepts user input in the form of a search string. A search string includes textual content.

As depicted, a user has already performed a search for "man." Part of the result is an A/V window 1910. The A/V window includes a frame grab 1912, which shows a man running from a store. Based upon the reference found in the search results, the query manager 1870 acquired the frame grab 1912 from a source external to the index (e.g., text-based index 1852) that it was searching. For example, the query manager 1870 pulls the frame grab 1912 from video 1842 or perhaps a mirror/archived copy of the video 1842.

As depicted, on the original search screen, a text-based search of a text-based index can show the non-text machine data that is part of the results of the search. Thus, the search can present (e.g., show or play) the non-text machine data (that is not actually part of the index being searched) as a result of a search of the text data in the text-based index.

3.4 Example Methodological Implementations

Figure 20:
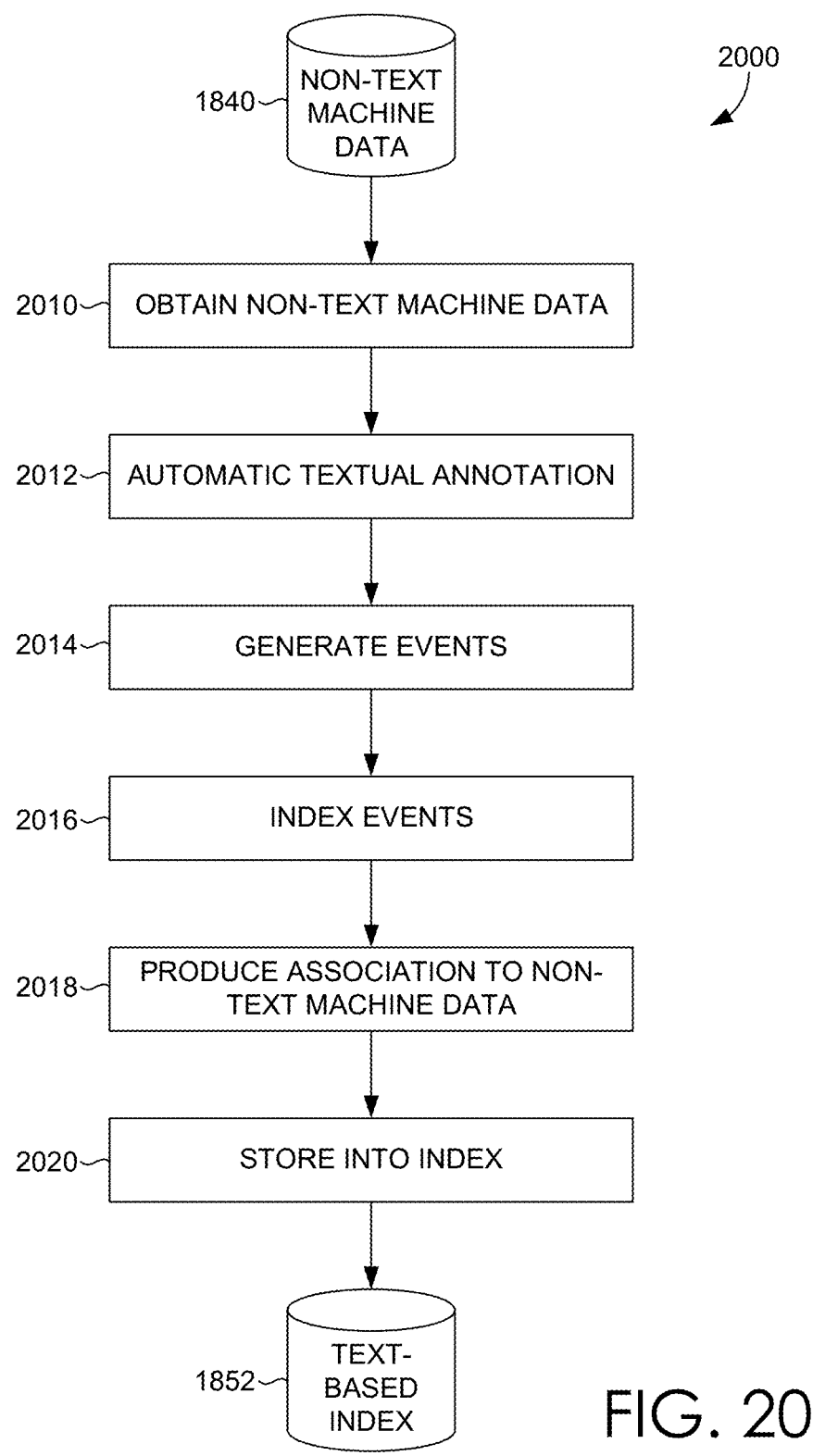
FIGS. 20 and 21 illustrate example methodological implementations in accordance with the technology described herein.
Figure 21:
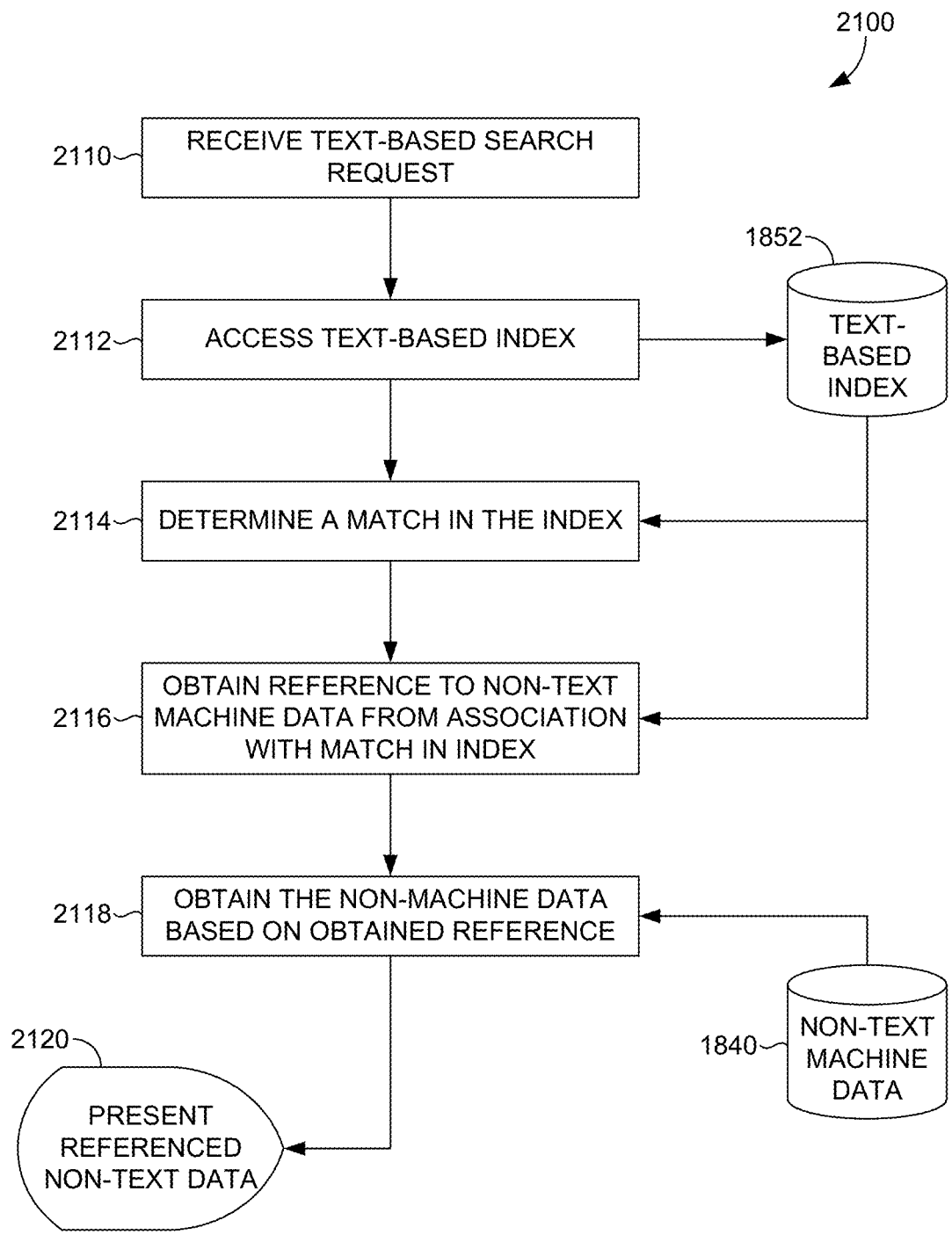

FIGS. 20 and 21 show example processes 2000 and 2100 illustrating the technology as described herein. The example processes 2000 and 2100 may be implemented as part of the example computing infrastructure 1800 and/or as part of the non-text machine data processing system 1820, as described herein. For the sake of simplicity, the operation blocks of these example processes 2000 and 2100 are described as being performed by a computer system.

At block 2010, the computer system obtains a dataset of non-text machine data (e.g., audio/visual ("A/V") machine data). The non-text machine data includes non-textual content. For example, A/V machine data includes A/V content, such as images, video, audio, or a combination thereof. The non-text machine data 1840 is an example of the non-text machine data described here with this block.

The non-text machine data is independent of textual content, which includes alphanumeric characters encoded in accordance with an alphanumeric encoding scheme. Examples of suitable alphanumeric encoding schemes include UNICODE standard and ASCII standard. Examples of suitable non-text machine data include audio data, image data, audio-visual data, video sequence, multimedia presentation, and compiled program data.

At block 2012, the computer system automatically annotates the dataset with associated textual annotations (or a particular segment of the dataset). The textual annotation uses textual content to describe the non-textual content of the non-text machine data (or a particular segment thereof).

The automatic annotating includes processing the dataset of non-text machine data to identify and textually label the non-textual content of the dataset (or a particular segment thereof). The identification and textual labeling are performed by the machine-learning engine 1831. The identification and textual labeling are performed by techniques such as object recognition, speech-to-text conversion, motion detection, and facial recognition. The annotator 1830 may perform the actions of this block.

At block 2014, the computer system generates an event for the dataset of non-text machine data (or a particular segment thereof). To do this, the system obtains a timestamp based on some portion of the non-text machine data. Based on that obtained timestamp and the textual annotations associated with the non-text machine data, the system generates the event. The annotation-index liaison 1850 may perform the actions of this block.

At block 2016, the computer system indexes the event to produce indexed text data. The text-based indexer 1850 may perform the actions of this block.

At block 2018, the computer system associates the indexed text data with or to the non-text machine data (or a particular segment thereof). The system produces a reference/pointer/link to the non-text machine data (or a particular segment of the data) in a storage location external to the text-based index. The stored entry includes the reference in association with the indexed text data and the associated non-text machine data. The text-based indexer 1850 may perform these actions of this block with the text-based index 1852. The annotation-index liaison 1850 may perform the actions of this block.

At block 2020, the computer system stores the indexed text data in a text-based index (e.g., text-based index 1852). The indexed text data is stored with an association to the non-text machine data (or a particular segment thereof). In some implementations, that association includes the reference to, at least a particular segment of, the non-text machine data that was the source of the textual annotation. The text-based indexer 1850 may perform the actions of this block with the text-based index 1852. Also, the annotation-index liaison 1850 may perform part of the actions of this block.

The example process 2100 of FIG. 21 illustrates the searching for non-text machine data using a text-based index in accordance with the descriptions herein. The example process 2100 of FIG. 21 utilizes a text-based index like that created by the example process 2000 of FIG. 20.

At block 2110, the computer system receives a search request that includes text data. Typically, this search request is initiated by a user or search requester.

At block 2112, the computer system accessing a text-based index (e.g., text-based index 1852) containing indexed text data.

At block 2114, the computer system determines that the text data of the received search request matches the indexed text data.

At block 2116, the computer system obtains a reference to non-text machine data stored in a storage location that is external to the text-based index. The reference is associated with the matching indexed text data in the text-based index.

The non-text machine data includes non-textual content. The non-text machine data is independent of textual content, which includes alphanumeric characters encoded in accordance with an alphanumeric encoding scheme. Examples of suitable alphanumeric encoding schemes include UNICODE standard and ASCII standard. Examples of suitable non-text machine data include audio data, image data, audio-visual data, video sequence, multimedia presentation, and compiled program data. The non-text machine data 1840 is an example of the non-text machine data described here with this block.

At block 2118, the computer system obtains the referenced non-text machine data (e.g., a frame grab) from the storage location external to the text-based index by using the obtained reference.

At block 2120, the computer system presents at least a portion of the obtained non-text machine data. FIG. 19 shows an example of this.

4.0 Additional Event-Based Technologies for Non-Text Machine Data

Events can be generated from non-text machine data, for example, using approaches described above. For example, each event could be generated (e.g., by indexer 1850) in association with a respective portion of non-text machine data (e.g., a frame of a video or a segment of an audio clip) and may include a timestamp corresponding to the portion of non-text machine data. This may optionally include annotating a portion of non-text machine data (e.g., with textual annotations, numerical annotations, or other types of annotations), and generating an event using the annotations.

In various implementations, annotations of a portion of non-text machine data may be associated with a corresponding event in any suitable manner. As indicated above, one or more textual annotations could be included in the portion of machine data of the event. To illustrate the forgoing, "_time source_time objects=man,car luminosity=0.7," which was described above, could be used as the portion of machine data of an event, and include a timestamp and the textual annotations. It is noted, the event is optionally generated to indicate a field and field label for the textual annotations. For example, an indicator of an "objects" field is included in the event in association with textual annotations, and an indicator of a "luminosity" field is included in the event in association with a textual annotation. As described above, in some implementations, the data intake and query system is pre-configured to automatically generate fields from portions of machine data of events using this format.

Another way annotations of a portion of non-text machine data may be associated with a corresponding event is in the form of one or more field values. For example, the annotation data corresponding to "0.7" above could use that information as a numerical field value of a metadata field (e.g., labeled luminosity). As another example, the annotation data corresponding to "man" and "car" could be included in an objects field.

It is also noted that some implementations could generate one or more events from non-text machine data without determining and/or associating annotations with the one or more events. For example, each event could in some cases only include a link, identifier, and/or other information associating the event with a corresponding portion of non-text machine data. Examples of a link are described above, which optionally may be assigned to the event as a field value (e.g., of a metadata field). Thus, it should be appreciated that each event could comprise any combination of content corresponding to an annotation(s) of non-text machine data and/or a link to or association with non-textual machine data.

Further aspects described below relate to event-based generation of annotations of non-text machine data at query time. Event-based generation of annotations of non-text machine data at query time (e.g., search time) may generally refer to approaches where the system processes non-text machine data to generate annotations of the non-text machine data in association with performing a query on events. For example, any of the various annotation data (e.g., textual and/or numerical) generated from non-textual machine data described above could be determined at query time in association with one or more events based on the non-text machine data being associated with those events. The annotation data can be used, for example, as part of determining results of the query and/or can be included in or associated with a results set (e.g., to generate visualizations of query results). In some cases, the annotation data is incorporated into field values and/or fields of events associated with the query.

Additional aspects described below relate to event-based correlation of datasets based on annotations of non-text machine data. In various implementations, information corresponding to the annotations can be utilized to correlate events of the datasets, such as using keywords, fields, field values, and/or other information generated by analyzing the non-text machine data. It is noted the annotations utilized for correlation can be generated at any suitable time. For example, one or more annotations may be associated with generating corresponding events. In addition, or instead, one or more annotations may be associated with processing a query of corresponding events.

It is noted that the events used with the aforementioned approaches may, for example, be generated by computing infrastructure 1800, data intake and query system 108 and/or other suitable infrastructure or portions thereof.

4.1 Event-Based Correlation of Non-Text Machine Data

As mentioned above, conventionally, event-based machine-data intake and query systems focused on text machine data. That is, machine data that contains textual content. With technologies described herein, non-text machine data is available and usable by such systems so that the text-based nature of the tools and components can be leveraged for and integrated with non-text machine data. In some implementations, this involves applying automated annotation generation to the non-text data and using those annotations with the text-based tools and components of event-based machine-data intake and query systems. As indicated above and described in additional detail below, these annotations can be used for generation of events associated with non-text machine data and/or for processing of a query against the events.

In various implementations, annotations of non-text machine data allow for correlation of non-text machine data with text machine data and/or other non-text machine data, providing insights into the relationships between the data. For example, annotations generated from non-text machine data can be associated with events corresponding to the non-text machine data and analyzed against events corresponding to text machine data and/or other non-text machine data for correlations between the events. Correlating a dataset comprising non-text machine data with at least one other dataset may generally refer to determining one or more relationships between the non-text machine data and the other data to determine, identify, and/or generate correlated information (e.g., a correlated dataset) from the datasets.

As indicated above, events generated from non-text machine data can be correlated against other events generated from text machine data and/or other non-text machine data. For example, as mentioned above, annotation-index liaison 1832 can generate events in accordance with the event-based machine-data intake and query systems discussed herein. Thus, events corresponding to non-text machine data can be analyzed with events corresponding to text machine data, using any of the various approaches described above. For example, similar to events corresponding to text machine data, default metadata fields can be associated with each event corresponding to non-text machine data. These metadata fields may include a number of "default fields" that are associated with all events, and may also include one more custom fields as defined by a user. The default metadata fields may include a host, source, and source type field including or in addition to a field storing the timestamp, as has been described above.

In various implementations, the datasets can be correlated utilizing the keywords described above. For example, it has been described that text-based indexer 1850 can store an association between the indexed textual annotations and the reference (or pointer) to the non-text machine data (or some portion or segment thereof). Based on this, text-based indexer 1850 produces new entries in text-based index 1852. Each entry has one or more words (e.g., keywords) derived from the textual annotations and an associated reference (or pointer) to the non-text machine data (or some portion or segment thereof).

Similarly, as has been described above with respect to FIG. 3, by way of example, text-based indexer 1850 and/or another indexer may produce entries in text-based index 1852 and/or another index comprising one or more keywords derived from text machine data (e.g., the raw machine data of events).

Thus, correlations can be made based on the keywords stored in association with the non-text machine data. For example, datasets may be correlated based on their keywords, such as by determining similarities and/or matches between keywords across datasets. As one example, a search or query could be performed on multiple datasets for events associated with one or more keywords specified by a query. A correlated dataset (e.g., search results) can be generated from the events which satisfy the query. As an example, the search results could include events from both datasets which satisfy the query (e.g., are associated with the keyword(s)) thereby producing a correlated dataset. In addition, or instead, events could be combined (e.g., merged) with other events and/or data objects based on similarities between the keywords of the events.

An example of a suitable interface for correlating non-text machine data based on keywords can correspond to search screen 600, described above. In that example, events list 608 could comprise one or more events from multiple datasets, with at least one of the datasets corresponding to non-text machine data (e.g., each dataset could correspond to a different source, host, and/or source type). Each event may be included in events list 608 based on being associated with a keyword corresponding to "buttercupgames." For example, the query in search bar 602 could define the keyword searched for in processing the query against the datasets, returning only events comprising the keyword. Thus, it should be appreciated that in some implementations, the correlation of the datasets is performed in processing a query on the datasets.

In addition to or instead of using keywords associated with the non-text machine data, one or more fields and/or field values associated with the non-text machine data can be used to correlate a dataset comprising non-text machine data with one or more other datasets. As an example, one or more metadata fields could be used. In addition, or instead, one or more of the fields and/or field values for the fields could correspond to annotations of the non-text machine data. Using this approach, for example, annotated field values and/or fields associated with non-text machine data could be correlated with non-annotated field values and/or fields associated with text machine data and/or correlated with non-annotated field values and/or fields associated with other non-text machine data.

4.2 Example Interface for Correlation of Non-Text Machine Data

FIG. 22 shows an example of an interface screen suitable for correlation of non-text machine data. In the present example, interface screen 2200 is a search screen of a search interface, by way of example only. For example, interface screen 2200 can correspond to search screen 600 of FIG. 6A. In other cases, a different user interface could be employed. In some cases, the correlation could be integrated into an application, which may not include interface elements, such as to define a query as shown. For example, the application could utilize a correlated dataset generated in accordance with aspects of the present disclosure.

In the example shown in FIG. 22, a user has entered query 2204 into query bar 2202, corresponding to search bar 602. Query 2204 defines a dataset corresponding to text machine data. In particular, the query defines the dataset which is an index labeled "badgescans," such that the system returns query results from the "badgescans" index. Thus, the events in events list 2208 are from that dataset. In addition, or instead, the query may similarly define a dataset corresponding to non-text machine data, such as has been described above, which would cause corresponding events to be included in the query results.

Figure 23:
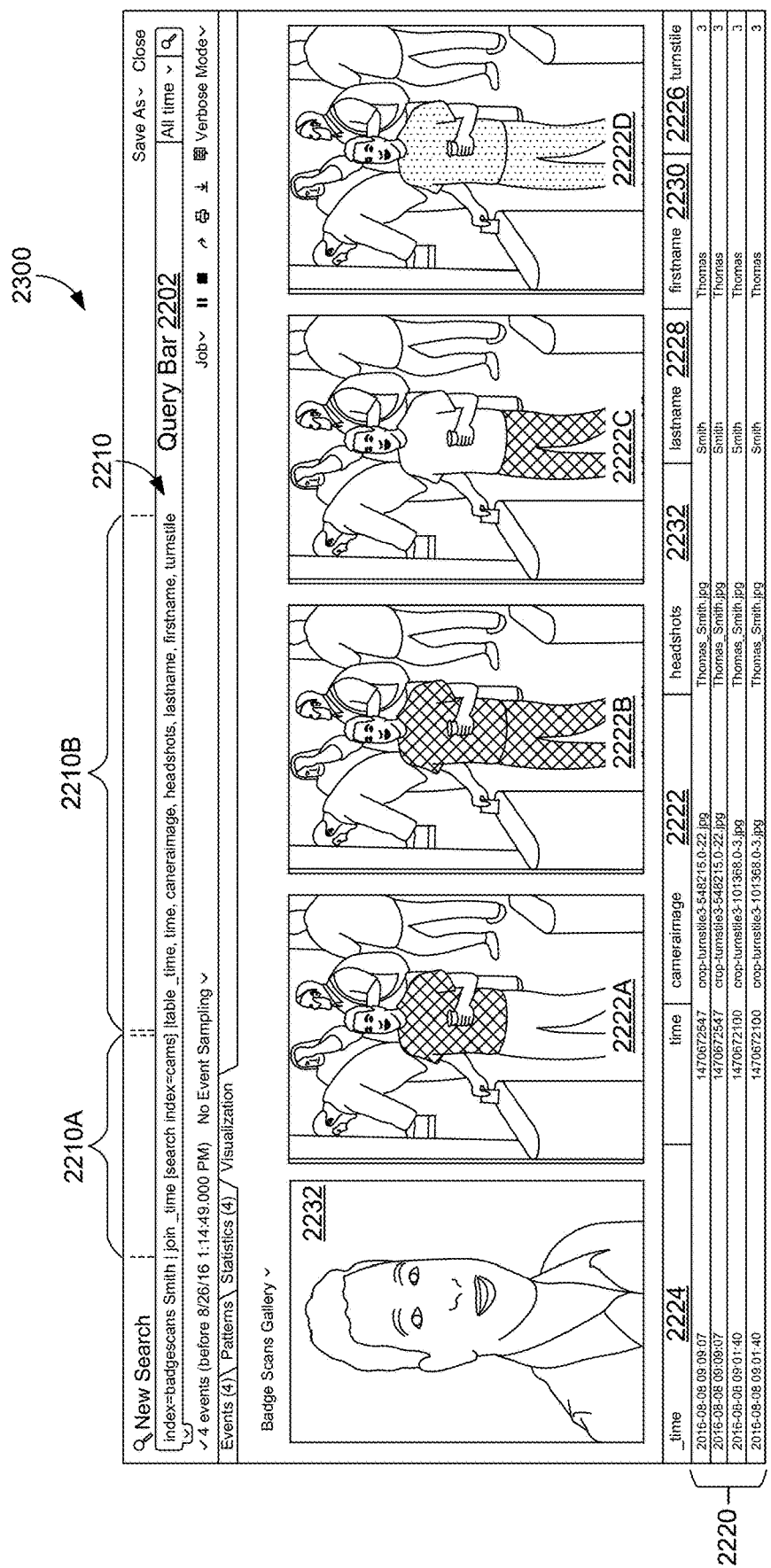
FIG. 23 illustrates an interface screen suitable for event-based correlation of non-text machine data in accordance with the disclosed embodiments.

In accordance with implementations of the present disclosure, a dataset corresponding to non-text machine data can be correlated with a dataset corresponding to text machine data, such as the dataset corresponding query 2204, and/or another dataset corresponding to non-text machine data (it is noted hybrid datasets may be employed corresponding to both non-text and text machine data). For example, FIG. 23 shows an example of an interface screen presenting a dataset determined by correlating events corresponding to non-text machine data and text machine data. Interface screen 2300 could be displayed in response to a user entering query 2210 into query bar 2202 and the query being submitted to the system for processing.

A correlation may be defined, for example, by a query. In the example shown, the correlation of datasets is defined in query 2210. In particular, the correlation is defined and instructed to be performed in execution of the query using command 2210A (a correlation command), although any number of commands could be employed. A "join" command is shown, byway of example. A correlating command may define one or more datasets to be correlated. In this case, the command specifies a dataset which is the result of a search on an index labeled "cams." By way of example only, the dataset to correlate with this dataset is defined by the portions of query 2210 preceding the pipe symbol "|." In this case, the dataset corresponds to the results of a keyword search for "Smith" on events of the index labeled "badgescans."

Query 2210 further specifies correlation criteria for the datasets, which can refer to criteria on which events are correlated. In the example shown, command 2210A specifies correlation criteria as a field for a join operation between the datasets. It is noted at least some criteria could be implicit in the command and need not be specified. As described above, other suitable criteria could include any number of fields, field values, field-value pair combinations, keywords, or other information associated with or derivable from the datasets. In this case, the "_time" field (e.g., a timestamp) is specified as a correlation criterion, such that the datasets (e.g., events) will be correlated based on values of that field in the datasets.

In the present example, command 2210A instructs the system to evaluate values of the field amongst the events across the datasets. Where a relationship is discovered between events in which an event from the first dataset has the same field value (e.g., timestamp) for that field as an event from the second dataset, those events can be selected for incorporation into a resultant correlated dataset. In some cases, the command could define that groups of events satisfying the criteria (e.g., having the identified relationship) across the datasets are to be merged or otherwise combined in the correlated dataset (e.g., comprising events), as shown. A merged or correlated event could result. In other cases, the events from each dataset could be kept separate in the correlated dataset. As a further example, information derived and/or calculated from data associated with the events could be included in the correlated dataset (e.g., an average of field values across events). This information may or may not be associated with an event in the correlated dataset. Although a specific example of correlation between datasets is shown, any suitable approach may be used. Examples include inner joins, outer joins, left joins, right joins, full joins, cross joins, and combinations thereof. Further, correlations are not limited to join based operations and mayor may not result in a correlated dataset comprising events. For example, as indicated above a correlated dataset could comprise one or more values calculated from correlated events (e.g., from field values of the events and/or associated portions of machine data).

As indicated above, by correlating the datasets, new insights into the relationships between datasets can be revealed, even where one or more of the datasets correspond to non-text machine data. Correlated data 2220 is an example of entries in a correlated dataset generated by the system executing query 2210. Assume events of the "cams" dataset each can comprise a link 2222 to a camera image of a video feed from a security camera and a timestamp 2224 corresponding to the camera image. Also assume events of the "badgescans" dataset each comprise a timestamp 2224 (or other time) corresponding to information captured by a badge scanning device. In accordance with implementations of the present disclosure, the similar information (e.g., time information) across the events can be used to link the datasets. For example, each camera image can be associated with a turnstile 2226 where a particular badge scan was registered, a last name 2228 and a first name 2230 assigned to the badge, and a link or reference to a head shot 2232 assigned to the badge.

Various implementations of the present disclosure allow for queries which define data processing workflows that can include intricate filtering, searching, and/or evaluation along with correlation of datasets associated with non-text machine data to enable users to uncover the relationships involving the non-text machine data. For example, correlated data 2220 is specific to non-text machine data associated with the keyword "Smith," despite none of the events corresponding to the non-text machine data including similar text. However, because the events are correlated with badgescan events that include similar text, a user who wishes to view only camera images associated with a person(s) named "Smith" may access that information via the correlated dataset.

In further respects, the correlated dataset or information therefrom can be used as an input to one or more applications, such as visualizations, dashboards, alerts, reports, aggregations, and the like (or to a subsequent portion of the query). For example, continuously processing query 2210 as new events are generated can allow for an alert comprising a specific camera image and head shot to be generated whenever that information indicates "Smith" enters a specific turnstile, as captured in a correlated dataset. As another example shown in FIG. 23, a visualization could be generated displaying camera images of user "Smith" along with a corresponding head shot from correlated data 2220 from multiple logged badge-ins. Thus, a user could investigate the non-text machine data for discrepancies between portions of non-text machine data or other insights, such as to discover where a person has used another person's badge for a badge-in.

In the present example, command 2210B prepares the correlated dataset for the visualization, by way of example only. In particular, command 2210B receives as an input correlated information from the correlated dataset produced using command 2210A. In presenting the visualization, the system can, for example, access the portions of non-text machine data associated with the events using the links or other associations included in the events. For example, each link 2222 can be utilized to access a corresponding camera image 2222A, 2222B, 2222C, and 2222D in association with a corresponding event/entry in the correlated dataset for display or presentation. Head shot 2232 could be accessed in a similar manner.

4.3 Query Time Annotation of Non-Text Machine Data

As mentioned above, some aspects of the present disclosure provide for query time annotation of non-text machine data. In various implementations the system can generate one or more annotations of non-text machine data in association with performing a query on events. For example, any of the various annotation data (e.g., textual and/or numerical) described above in relation to generation of events may be associated with events at query time.

In some aspects of the present disclosure, generation of the annotations of non-text machine data is defined by a query. For example, one or more commands of the query may instruct the system to generate the annotations from the non-text machine data. The query may further define or specify the non-text machine data for which to generate annotations. This may be accomplished using one or more parameters of one or more commands.

In some cases, the non-text machine data is defined in the query for annotation with respect to events linked to the non-text machine data. For example, as described above, each event may be associated with a portion of non-text machine data. Thus, a query and/or commands may define or specify one or more of the events, resulting in corresponding portions of non-text machine data being processed for annotation. As an example, the query and/or command may reference the portions of non-text machine data via a dataset (e.g., dataset label) of events. In the example above, "cams" could refer to each event and corresponding portion of non-text machine data in the dataset labeled "cams." As another example, the dataset could be implicit, such as a resultant dataset of executing one or more previous commands of the query (e.g., defined by a portion of the query preceding the pipe symbol "|"). In addition to or instead of the forgoing, one or more criterion may be specified or otherwise utilized by a query and/or command to determine a dataset of events for annotation (e.g., using parameters of commands) and/or how to annotate events (e.g., a reference to an algorithm or formula use to generate an annotation). This can include field values, keywords, field labels, and the like. For example, a command may specify that events to be annotated include only those having a field value present for a camera image field. It is noted not all events in a dataset input to an annotation command may be annotated and some could be annotated with a default or null value. It will be appreciated one or more of the criterion for annotation may be user defined and/or system defined (e.g., as part of a command). Further, the system may optimize or otherwise modify a user defined query.

Generating an annotation of non-text machine data may generally refer to a process whereby the non-text machine data is analyzed to generate the annotation associated with the non-text machine data. Examples have been described above. For example, a command could instruct the system to analyze a respective image (if present) associated with each event and generate a luminosity value as an annotation of the image and/or event. In addition, or instead, one or more object labels could be extracted from each image, if present. For a portion of audio, the annotation could comprise one or more words extracted from the audio or an indicator thereof. In some cases, an annotation is based on whether or not the system determines a portion of non-text machine data has a pre-defined quality and/or feature. For example, an annotation could be based on whether an image includes a man or whether a portion of audio includes the spoken word "patent." By performing this analysis at query time, the qualities and features being analyzed can be targeted thereby reducing the processing of the data (e.g., all possible objects need not be identified, just specific objects relevant to the query). Further, the analysis can be optimized to the specific qualities and/or features rather than generalized, allowing for more efficient processing. At least some qualities and/or features being identified or determined to generate annotations could be specified in one or more terms or parameters of a query or command, such as by a user (e.g., via reference to a label such as an object label or more generally a feature label).

In some cases, in generating annotations, the system analyzes the portion of non-text machine data of each event separately or independently with respect to one or more features and/or qualities. For example, a luminosity value could be specific to a particular image and its associated event. In addition, or instead, one or more of the portions of non-text machine data can be analyzed on the aggregate such that an annotation corresponds to aggregated portions of non-text machine data. For example, a set of images could be combined and analyzed concurrently (e.g., each associated event or a corresponding aggregated data object could be assigned the resultant annotation). Thus, one or more annotations can be specific to the portion of non-text machine data or correspond to more than one portion of non-text machine data. For example, one annotation of an event could comprise an average luminosity value for each frame of a video and another may comprise a luminosity value of a single frame. The forgoing may be defined by or specified in the query and/or commands (or parameters thereof).

As indicated above, the system can associate annotations generated for non-text machine data with one or more events and/or a dataset generated from one or more events. For example, each portion of non-text machine data may be associated with a corresponding annotation. This may be accomplished by the system associating a field value and/or field corresponding to an annotation with the event associated with the portion of non-text machine data. As an example, the luminosity value generated from an image could be assigned to a luminosity field of an event based on the event comprising a link or other association with the image. These fields may be treated similar to other fields described herein, allowing users to investigate non-textual features and qualities of non-text machine data.

In some implementations, by associating annotations with one or more events and/or a dataset, the system can leverage the annotations for subsequent processing of the data. For example, annotations associated with a dataset produced as an output of a portion of a query can be utilized in processing subsequent portions of the query (e.g., as input into subsequent query commands). For example, the query can reference and process the fields and/or field values corresponding to annotations similar to other fields and/or field values associated with text machine data. Similarly, visualizations, dashboards, alerts, reports, aggregations, and the like can utilize the annotations as inputs. As an example, an alert could be generated where the luminosity of an image associated with an event exceeds a threshold value. As another example, luminosity values of images from different cameras could be charted against each other over time.

4.4 Example Interface for Query Time Annotation of Non-Text Machine Data

Figure 25:
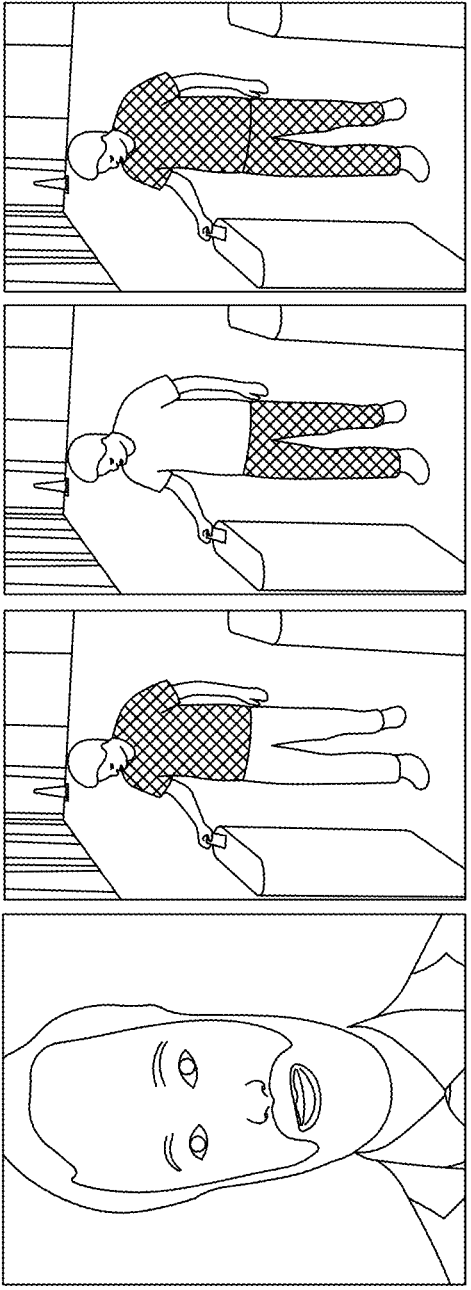
FIG. 25 illustrates an interface screen suitable for query time annotation of non-text machine data in accordance with the disclosed embodiments.

FIGS. 24 and 25 show examples of interface screens suitable for annotation of non-text machine data. In the present example, interface screens 2400 and 2500 are search screens of a search interface, by way of example only. For example, interface screens 2400 and 2500 can correspond to search screen 600 of FIG. 6A. In other cases, a different user interface could be employed. In some cases, interface screens 2400 and 2500 are part of the same interface associated with interface screens 2200 and 2300.

FIGS. 24 and 25 are used to illustrate examples of non-text machine data associated with a dataset being annotated at query time. Interface screen 2400 may be displayed based on the system executing query 2410 to display results of a dataset generated by execution of the query. By way of example, query 2410 in query bar 2202 of interface screen 2400 defines annotation of a dataset. In this case, the dataset is defined by portions of query 2410 preceding annotation command 2420. Annotation command 2420 includes "imagediff" as a command identifier which can be used with zero or more parameters. In this case, the parameters include "headshots" and "cameraimage" which are field labels utilized to specify which fields the system is to use for analysis performed by the command of the query. In this case, the field values of the fields include links to non-text machine data. As indicated above, other parameters and/or criterion can be specified for the annotation including one or more specific field values, links to or identifiers of non-text machine data to be analyzed, particular events, datasets, and the like. At least some of this information could be a default to the command.

By way of example, annotation command 2420 instructs a search head and/or indexer to annotate portions of non-text machine data associated with the events in the dataset recited as an input to the command (and optionally store associations between the annotations and corresponding events). For example, the system can for one or more events associated with the dataset, access the portion of non-text machine data using one or more links associated with the events in order to analyze the associated content. It is noted an event may be associated with any number of portions of non-text machine data and could include multiple links (e.g., be associated with multiple portion of non-text machine data). Thus, it may be desirable to allow a user to specify a field comprising the links for the command or otherwise identify particular links. However, in some cases links need not be specified.

In the present example, for each event in the input dataset, annotation command 2420 uses the link to access the corresponding camera image and head shot. Using image analysis and processing (e.g., pixel processing), the system computes at least one distance metric between the camera image and the head shot associated with the event. Each distance metric quantifies similarity between the camera image and the head shot and/or a face in the camera image and head shot. In the present example, a distance metric can increase in value as the similarity between the images increase and decrease as the similarity decreases. In the present example, each event and its associated non-text machine data is processed separately to generate any associated annotations. The distance metrics and/or other annotations determined from the non-text machine data can be utilized as inputs to visualizations, dashboards, or other applications, as described above.

In the present example, the annotations are associated with the dataset. For example, each event is associated with its corresponding annotation(s). In this case, the association comprises a new field created by annotation command 2420 for a distance metric, where corresponding field values of events comprise a corresponding annotation. For example, in FIG. 24 one distance metric is associated with field 2240 and another with field 2242. In the example shown, each displayed row can correspond a respective event and includes field values associated with the event. Typically, one or more field values, such as those of field 2260 can be extracted by the system from text content associated with events using one or more extraction rules (e.g., at query time). In accordance with implementations of the present disclosure, one or more field values can also be derived by the system from non-text content associated with events using one or more annotation rules (e.g., at query time), which may or may not correspond to a command of a query.

Using the distance metric, a user can, for example, identify notable badge-ins to a turnstile. For example, where the distance metric indicates the head shot is dissimilar to the camera image, a different person may have accessed the turnstile using another person's badge. The user could, for example, identify these suspicious events in interface screen 2400, by way of example. Further, the user could modify query 2410 and/or submit additional queries to further investigate the underlying data associated with the events. For example, in implementations where annotation command 2420 associates annotations with the dataset (e.g., as field values), subsequent commands of the query can utilize the annotations for processing the dataset. As other examples, the user could annotate the non-text machine data (and associated events) using a different command or modify the annotation command in a subsequent query.

Interface screen 2500 can correspond to an example of a visualization displayed based on query 2510 being executed by the system. Query 2510 is similar to query 2410 with added filtering and searching defined prior to the annotation command. In this example, the annotation command may operate on a subset of the initial dataset of the query comprising the events which include the keyword "Monroe." Thus, the resultant dataset can include distance metrics for events associated with a person named Monroe, as shown, and only those events may be processed for annotation. In this case, results of the query are provided as inputs to a visualization which displays images associated with events in the results and an associated head shot. The visualization and/or query command may identify notable events based on the annotations. For example, the visualization may select one or more camera images for presentation to the user based on associated annotations (e.g., the distance metrics), such as those which exceed a threshold value. As another example, the query command or a subsequent query command could automatically filter the dataset based on the annotations to retain the subset based on the annotations. It should therefore be appreciated that using approaches described herein, features and/or qualities of non-text machine data can be captured (prior to and/or at query time) and be consumed by further applications.

4.5 Illustrative Computer Operations

FIGS. 26-27 illustrate methods in accordance with embodiments of the present disclosure. Although method 2600 of FIG. 26 and method 2700 of FIG. 27 are provided as separate methods, the methods, or aspects thereof, can be combined into a single method or combination of methods. As can be appreciated, additional or alternative steps may also be included in different embodiments.

With reference to FIG. 26, FIG. 26 illustrates a method of event-based correlation of non-text machine data, in accordance with embodiments of the present disclosure. Such a method may be performed, for example, at a data intake and query system, such as has been described above. At block 2608, annotations of portions of non-text machine data are generated. Block 2608 may be performed at any suitable time in method 2600 and in some cases may be performed as part of one or more other blocks of the method. For example, block 2608 could at least partially be incorporated into one or more of blocks 2610 and 2612 and/or prior to either of those blocks. At block 2610, a first dataset of events are associated with the portions of non-text machine data. At block 2612, a query is executed which correlates the first dataset with the second dataset using the annotations to produce a correlated dataset. At block 2614, presentation is caused of data based on the correlated dataset.

With reference to FIG. 27, FIG. 27 illustrates a method of query time annotation of non-text machine data, in accordance with embodiments of the present disclosure. Such a method may be performed, for example, at a data intake and query system, such as has been described above. At block 2710, method 2700 includes generating a dataset of events associated with portions of non-text machine data. At block 2712, method 2700 includes executing a query on the dataset, the query automatically generating annotations of the portions of non-text machine data to produce a results set. At block 2714, method 2700 includes causing presentation of data based on the result set.

In the above description of example implementations, for purposes of explanation, specific numbers, materials configurations, and other details are set forth in order to explain the present invention better, as claimed. However, it will be apparent to one skilled in the art that the claimed invention may be practiced using different details than the example ones described herein. In other instances, well-known features are omitted or simplified to clarify the description of the example implementations.

The inventor(s) intend the described example implementations to be primarily examples. The inventor(s) do not intend these example implementations to limit the scope of the appended claims. Rather, the inventor(s) have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

What is claimed is:

1. A computer-implemented method comprising:
   generating a first dataset of events and a second dataset of events,
      wherein each event of the first dataset of events corresponds to a portion of non-text machine data, the non-text machine data comprising images, video, audio, or a combination thereof, the events of the first dataset of events generated by:
         automatically annotating, via machine learning, the non-text machine data with associated textual annotations using textual content to describe non-context content of the non-text machine data, and
         generating the events, of the first dataset of events, using timestamps associated with the non-text machine data and the textual annotations associated with the non-text machine data, and
      wherein each event of the second dataset of events includes a portion of raw machine data in textual form and produced by a component within an information technology environment and associated with a timestamp;
   receiving, from a client device by a data intake and query system, a query instructing correlation of:
      the first dataset of events, with
      the second dataset of events;
   generating, by the data intake and query system, a representation of a third dataset of combined events, each combined event combining corresponding events from the first and second datasets of events based on the corresponding events including a common field value for a field specified by the query; and
   causing, by the data intake and query system, the client device to display a representation of the third dataset including a first combined event to provide a correlation between a first portion of text machine data associated with the second dataset and a first portion of non-text machine data associated with the first dataset; and
   causing, by the data intake and query system, the client device to present an alert based on identification of a trigger identified in association with the first combined event.

2. The method of claim 1, wherein a first event of the first dataset includes a link to the portion of non-text machine data associated with the first event.

3. The method of claim 1, wherein the representation of the third dataset includes rows representing the combined events, a first column representing a first field of the first dataset, a second column representing a second field of the second dataset, and a third column representing the field specified by the query.

4. The method of claim 1, wherein the common field value describes, by text, content of the portion of non-text machine data associated with each of the corresponding events from the first dataset represented in the third dataset set of combined events.

5. The method of claim 1, wherein the non-text machine data comprises an image, and the common field value represents an object identified in the image based on object recognition.

6. The method of claim 1, wherein the portion of non-text machine data comprises a frame grab of a video sequence of a video file, a subset of frames of a video sequence of a video file, a clip of audio from an audio file or video file, one or more images from a collection of still images, or a cropped image of an image file.

7. The method of claim 1, wherein the query instructs the correlation using a join command that instructs a join operation that combines a first event of the corresponding events from the first dataset with a second event of the corresponding events from the second dataset based on the first event and the second event having the common field value for the field specified by the query.

8. The method of claim 7, wherein the third dataset comprises the first event and the second event.

9. The method of claim 1, wherein the generating of the third dataset combines at least a first event from the first dataset and a second event from the second dataset resulting in a merged event, the merged event being included in the third dataset.

10. One or more computer-readable media storing instructions thereon that, when executed by one or more processors, cause the one or more processors to perform operations comprising:
- generating a first dataset of events and a second dataset of events,
  - wherein each event of the first dataset of events corresponds to a portion of non-text machine data, the non-text machine data comprising images, video, audio, or a combination thereof, the events of the first dataset of events generated by:
    - automatically annotating, via machine learning, the non-text machine data with associated textual annotations using textual content to describe non-context content of the non-text machine data, and
    - generating the events, of the first dataset of events, using timestamps associated with the non-text machine data and the textual annotations associated with the non-text machine data, and
  - wherein each event of the second dataset of events includes a portion of raw machine data in textual form and produced by a component within an information technology environment and associated with a timestamp;
- receiving, from a client device by a data intake and query system, a query instructing correlation of:
  - the first dataset of events with
  - the second dataset of events;
- generating, by the data intake and query system, a representation of a third dataset of combined events, each combined event combining corresponding events from the first and second datasets of events based on the corresponding events including a common field value for a field specified by the query; and
- causing, by the data intake and query system, the client device to display a representation of the third dataset including a first combined event to provide a correlation between a first portion of text machine data associated with the second dataset and a first portion of non-text machine data associated with the first dataset; and
- causing, by the data intake and query system, the client device to present an alert based on identification of a trigger identified in association with the first combined event.

11. The one or more computer-readable media of claim 10, wherein a first event of the first dataset includes a link to the portion of non-text machine data associated with the first event.

12. The one or more computer-readable media of claim 10, wherein the representation of the third dataset includes rows representing the combined events, a first column representing a first field of the first dataset, a second column representing a second field of the second dataset, and a third column representing the field specified by the query.

13. The one or more computer-readable media of claim 10, wherein the common field value describes, by text, content of the portion of non-text machine data associated with each of the corresponding events from the first dataset represented in the third dataset set of combined events.

14. A computer-implemented system comprising:
- one or more processors; and
- one or more computer-readable media storing instructions thereon that, when executed by the one or more processors, cause the one or more processors to perform operations comprising:
  - generating a first dataset of events and a second dataset of events,
    - wherein each event of the first dataset of events corresponds to a portion of non-text machine data, the non-text machine data comprising images, video, audio, or a combination thereof, the events of the first dataset of events generated by:
      - automatically annotating, via machine learning, the non-text machine data with associated textual annotations using textual content to describe non-context content of the non-text machine data, and
      - generating the events, of the first dataset of events, using timestamps associated with the non-text machine data and the textual annotations associated with the non-text machine data, and
    - wherein each event of the second dataset of events includes a portion of raw machine data in textual form and produced by a component within an information technology environment and associated with a timestamp;
  - receiving, from a client device by a data intake and query system, a query instructing correlation of:
    - the first dataset of events with
    - the second dataset of events;
  - generating, by the data intake and query system, a representation of a third dataset of combined events, each combined event combining corresponding events from the first and second datasets of events based on the corresponding events including a common field value for a field specified by the query; and
  - causing, by the data intake and query system, the client device to display a representation of the third dataset including a first combined event to provide a correlation between a first portion of text machine data associated with the second dataset and a first portion of non-text machine data associated with the first dataset; and
  - causing, by the data intake and query system, the client device to present an alert based on identification of a trigger identified in association with the first combined event.

15. The system of claim 14, wherein a first event of the first dataset includes a link to the portion of non-text machine data associated with the first event.

16. The system of claim 15, wherein the representation of the third dataset includes rows representing the combined events, a first column representing a first field of the first dataset, a second column representing a second field of the second dataset, and a third column representing the field specified by the query.

17. The system of claim 15, wherein the common field value describes, by text, content of the portion of non-text machine data associated with each of the corresponding events from the first dataset represented in the third dataset set of combined events.

* * * * *